US011738275B2

(12) United States Patent
Khan et al.

(10) Patent No.: US 11,738,275 B2
(45) Date of Patent: *Aug. 29, 2023

(54) VIRTUAL REALITY PRESENTATION OF REAL WORLD SPACE

(71) Applicant: Sony Interactive Entertainment LLC, San Mateo, CA (US)

(72) Inventors: Mohammed Khan, San Mateo, CA (US); Miao Li, San Mateo, CA (US); Ken Miyaki, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/381,172

(22) Filed: Jul. 20, 2021

(65) Prior Publication Data

US 2021/0346811 A1 Nov. 11, 2021

Related U.S. Application Data

(63) Continuation of application No. 16/787,897, filed on Feb. 11, 2020, now Pat. No. 11,065,551, which is a (Continued)

(51) Int. Cl.
*A63F 13/86* (2014.01)
*A63F 13/53* (2014.01)
(Continued)

(52) U.S. Cl.
CPC ............ *A63F 13/86* (2014.09); *A63F 13/211* (2014.09); *A63F 13/213* (2014.09);
(Continued)

(58) Field of Classification Search
CPC .... A63F 13/213; A63F 13/215; A63F 13/216; A63F 13/25; A63F 13/26; A63F 13/44;
(Continued)

(56) References Cited

U.S. PATENT DOCUMENTS 9,530,426 B1* 12/2016 Wright .................... H04S 7/302
9,573,062 B1* 2/2017 Long ...................... G11B 27/00
(Continued)

*Primary Examiner* — Michael A Cuff
(74) *Attorney, Agent, or Firm* — Penilla IP, APC

(57) ABSTRACT

Methods and systems are provided for delivering a virtual reality (VR) experience of a real world space to a remote user via a head mounted display (HMD). A method provides for sending a request for the VR experience of the real world space and identifying a viewing location made by the user. The method includes operations for mapping the viewing location to a real world capture system for capturing video and audio at a location that corresponds to the viewing location and receiving real world coordinates for the real world capture system. Further, the method accesses a user profile of the user and receives a video stream of the real world space captured by the real world capture system. The method is able to identify and reskin a real world object with a graphical content element by overlaying the graphical content item in place of the image data associated with the real world object.

17 Claims, 17 Drawing Sheets

Related U.S. Application Data continuation of application No. 15/901,845, filed on Feb. 21, 2018, now Pat. No. 10,556,185.

(60) Provisional application No. 62/566,266, filed on Sep. 29, 2017.

(51) Int. Cl.

| | | |
|---|---|---|
| *G06T 19/00* | (2011.01) | |
| *A63F 13/5255* | (2014.01) | |
| *A63F 13/211* | (2014.01) | |
| *A63F 13/77* | (2014.01) | |
| *A63F 13/63* | (2014.01) | |
| *G06T 15/20* | (2011.01) | |
| *A63F 13/213* | (2014.01) | |
| *A63F 13/215* | (2014.01) | |
| *A63F 13/216* | (2014.01) | |
| *A63F 13/25* | (2014.01) | |
| *A63F 13/26* | (2014.01) | |
| *A63F 13/35* | (2014.01) | |
| *A63F 13/428* | (2014.01) | |
| *A63F 13/44* | (2014.01) | |
| *A63F 13/525* | (2014.01) | |
| *A63F 13/61* | (2014.01) | |
| *A63F 13/79* | (2014.01) | |
| *G06T 11/60* | (2006.01) | |
| *H04N 13/117* | (2018.01) | |
| *H04N 13/344* | (2018.01) | |
| *G06F 3/01* | (2006.01) | |

(52) U.S. Cl.
CPC .......... *A63F 13/215* (2014.09); *A63F 13/216* (2014.09); *A63F 13/25* (2014.09); *A63F 13/26* (2014.09); *A63F 13/35* (2014.09); *A63F 13/428* (2014.09); *A63F 13/44* (2014.09); *A63F 13/525* (2014.09); *A63F 13/5255* (2014.09); *A63F 13/53* (2014.09); *A63F 13/61* (2014.09); *A63F 13/63* (2014.09); *A63F 13/77* (2014.09); *A63F 13/79* (2014.09); *G06T 11/60* (2013.01); *G06T 15/20* (2013.01); *G06T 19/006* (2013.01); *A63F 2300/8082* (2013.01); *G06F 3/012* (2013.01); *H04N 13/117* (2018.05); *H04N 13/344* (2018.05)

(58) Field of Classification Search
CPC .... A63F 13/525; A63F 13/5258; A63F 13/53; A63F 13/61; A63F 13/63; A63F 13/86; A63F 2300/8082; H04N 13/344; H04N 13/117; G06T 19/006; G06T 15/20; G06F 3/012
USPC .......................................................... 463/31
See application file for complete search history.

(56) References Cited

U.S. PATENT DOCUMENTS

| | | | | |
|---|---|---|---|---|
| 10,438,262 | B1* | 10/2019 | Helmer | G06V 10/255 |
| 10,531,137 | B1* | 1/2020 | Matak | A63B 24/0062 |
| 10,666,768 | B1* | 5/2020 | Johnson | H04W 24/08 |
| 10,733,565 | B1* | 8/2020 | Stephens | H04N 7/181 |
| 2011/0225516 | A1* | 9/2011 | Goldman | G06Q 30/02 |
| | | | | 715/753 |
| 2013/0093759 | A1* | 4/2013 | Bailey | G06F 16/434 |
| | | | | 345/419 |
| 2013/0278631 | A1* | 10/2013 | Border | G06Q 30/02 |
| | | | | 345/633 |
| 2013/0317912 | A1* | 11/2013 | Bittner | G06Q 50/01 |
| | | | | 345/633 |
| 2014/0299660 | A1* | 10/2014 | Melzer | H04L 9/3231 |
| | | | | 235/375 |
| 2014/0364209 | A1* | 12/2014 | Perry | A63F 13/06 |
| | | | | 463/31 |
| 2017/0157512 | A1* | 6/2017 | Long | A63F 13/497 |
| 2017/0205892 | A1* | 7/2017 | Petrovskaya | G06T 17/20 |
| 2017/0243400 | A1* | 8/2017 | Skidmore | G06F 3/011 |
| 2017/0243403 | A1* | 8/2017 | Daniels | G06T 19/20 |
| 2017/0264936 | A1* | 9/2017 | Depies | G02B 27/0093 |
| 2018/0122142 | A1* | 5/2018 | Egeler | G06F 16/5854 |
| 2018/0323972 | A1* | 11/2018 | Reed | G06F 3/013 |
| 2019/0094981 | A1* | 3/2019 | Bradski | G06F 3/017 |

\* cited by examiner

VIRTUAL REALITY PRESENTATION OF REAL WORLD SPACE

CLAIM OF PRIORITY

This application is a Continuation of U.S. patent application Ser. No. 16/787,897, filed on Feb. 11, 2020, (U.S. Pat. No. 11,065,551, issued on Jul. 20, 2021), entitled "VIRTUAL REALITY PRESENTATION OF REAL WORLD SPACE," which is a Continuation of U.S. patent application Ser. No. 15/901,845, filed on Feb. 21, 2018 (U.S. Pat. No.: 10,556,185, issued on Feb. 11, 2020), entitled "VIRTUAL REALITY PRESENTATION OF REAL WORLD SPACE," which further claims priority to U.S. Provisional Application No. 62/566,266, filed Sep. 29, 2017, entitled "VIRTUAL REALITY PRESENTATION OF REAL WORLD SPACE," which are herein incorporated by reference.

FIELD OF THE DISCLOSURE

The present disclosure relates generally to virtual reality (VR) presentations of real world spaces and more particularly to methods and systems for providing a user of a head mounted display (HMD) with a VR experience of a live event such as an e-sports event that is remote to the user.

BACKGROUND

Electronic sports, or "esports," are becoming an increasingly popular form of entertainment for spectators. Esports are a form of competition typically involving multiplayer video games that are facilitated by electronic systems such as video game servers and computer systems. Some of the more popular video game genres that are played in an esports context are real-time strategy games, combat games, first-person shooter (FPS) shooter games, and multiplayer online battle arena (MOBA) games. Esports events become spectator events when the Esports game is played live in front of an audience. Many esports events are held in large arenas and provide audience members a view of the game action on a large display such as a jumbotron as well as live commentary from a commentator team. Thus, an esports live audience member is given an immersive real world experience of the game action, the players, the commentators, and the audience itself.

In many instances, esports fans that are not able to attend an esports event in person are still able to tune in via an online live stream of the event. Thus, remote spectators are able to get a generic video stream of the event that is produced by, for example, the organization hosting the event or a distribution company distributing the event. In either scenario, current video streams of esports events are not immersive. For example, a remote spectator watching an esports video stream on a display will not feel as if they are immersed in the arena where the esports event is being hosted. Moreover, there may be a plurality of camera views and "screen views" (e.g., what a player's screen is displaying) that may be of interest to the spectator. Current broadcasts of esports to not allow consumers to choose which of the views they want shown.

It is in this context that embodiments arise.

SUMMARY

Embodiments of the present disclosure relate to methods and systems for delivering a virtual reality (VR) presentation of a real world space to a remote user via a head mounted display (HMD). In one embodiment, a method includes an operation for sending a request for the VR presentation of the real world space and for identifying a seat selection within the real world space made by the user, the seat selection being mapped to a real world capture system configured for capturing video and audio at a location that corresponds to the seat selection. The method also includes operations for receiving mapping data for the real world capture system, the mapping data including real world coordinates for the real world capture system. The method is able to access a user profile of the user having user preferences. According to some embodiments, the method receives a video stream of the real world space from the real world capture system, the video stream including a plurality of video images captured by one or more cameras of the real world capture system, the plurality of images being presented in the HMD from a perspective associated with the real world coordinates of the real world capture system corresponding to the seat selection. The method further includes operations for identifying a real world object configured for reskinning during presentation from the plurality of images of the video stream. According to this and other embodiments, the method reskins the real world object within the plurality of video images based on the user profile, the reskinning including overlaying a graphical content element in place of the image data associated with the real world object. In certain embodiments, the overlaying is geometrically adjusted based on the perspective associated with the real world capture system corresponding to the seat selection. The method then presents the video stream having been reskinned to the user via the HMD for the VR presentation.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
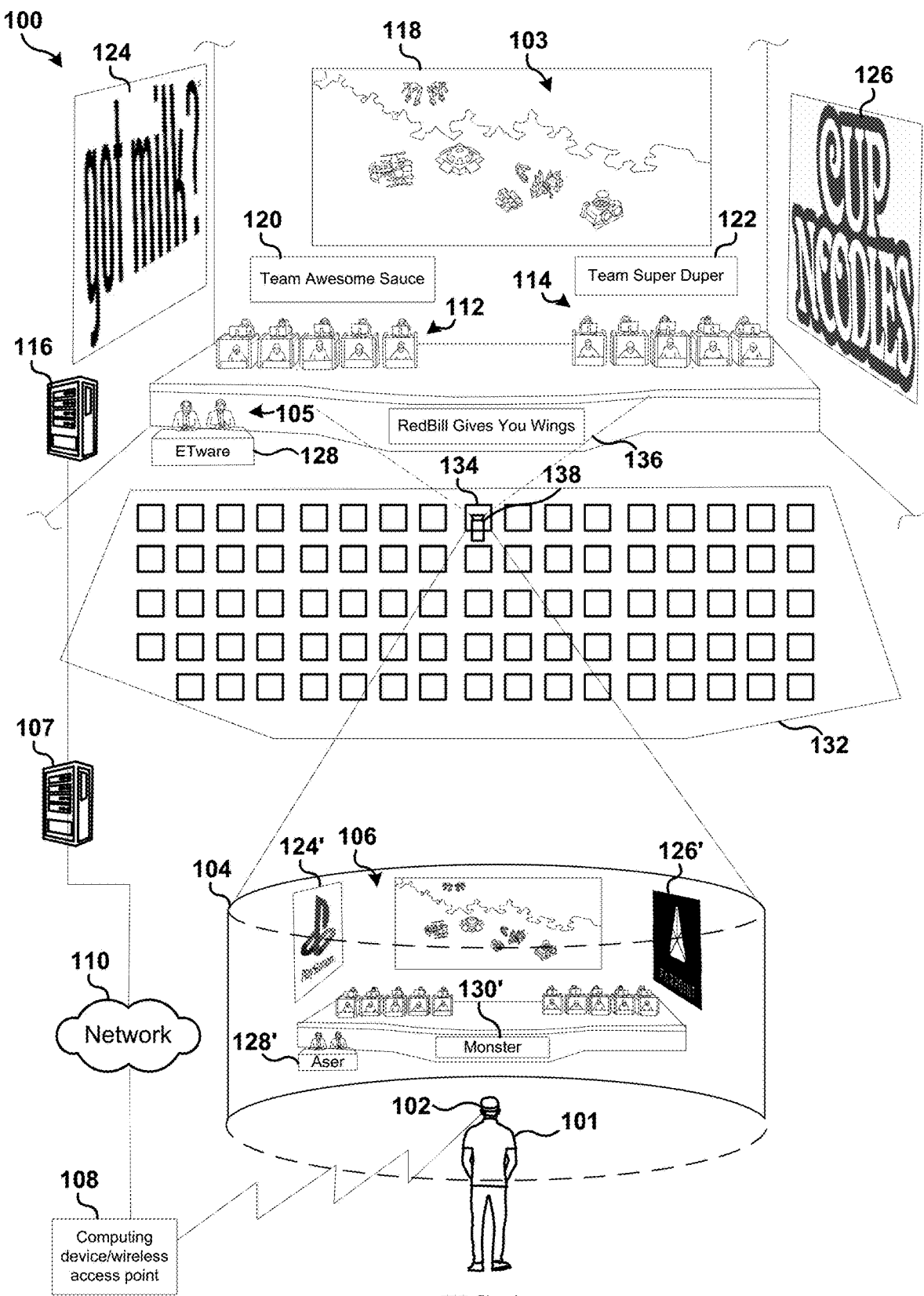
FIG. 1 is a conceptual illustration of an embodiment for delivering a virtual reality (VR) presentation of an esports events taking place in a remote real world space.

The following embodiments describe methods, computer programs, and apparatuses for providing an immersive virtual experience of a live event to a remote spectator via HMD. It will be obvious, however, to one skilled in the art, that the present disclosure may be practiced without some or all of these specific details. In other instances, well known process operations have not been described in detail in order to not unnecessarily obscure the present disclosure.

As electronic sports, or "esports," are becoming an increasingly popular form of entertainment for spectators. Esports are a form of competition typically involving multiplayer video games that are facilitated by electronic systems such as video game servers and computer systems. Some of the more popular video game genres that are played in an esports context are real-time strategy games, combat games, first-person shooter (FPS) shooter games, and multiplayer online battle arena (MOBA) games. Esports events become spectator events when the Esports game is played live in front of an audience. Many esports events are held in large arenas and provide audience members a view of the game action on a large display such as a jumbotron as well as live commentary from a commentator team. Thus, an esports live audience member is given an immersive real world experience of the game action, the players, the commentators, and the audience itself.

In many instances, esports fans that are not able to attend an esports event in person are still able to tune in via an online live stream of the event. Thus, remote spectators are able to get a generic video stream of the event that is produced by, for example, the organization hosting the event or a distribution company distributing the event. In either scenario, current video streams of esports events are not immersive. For example, a remote spectator watching an esports video stream on a display will not feel as if they are immersed in the arena where the esports event is being hosted. Moreover, there may be a plurality of camera views and "screen views" (e.g., what a player's screen is displaying) that may be of interest to the spectator. Current broadcasts of esports to not allow consumers to choose which of the views they want shown.

Methods and systems presented here allow a remote user of an HMD to view a VR presentation of a real world event such as an esports event. According to some embodiments, real world data such as video, audio, and other data are captured by devices located within a real world space such as an auditorium, an arena, a concert hall, a warehouse. The real world data including video and audio data are delivered to a VR hosting server or other content provider for processing. The VR hosting server is able to process the real world data and render a VR presentation of the real world event. The VR presentation data is sent over a network to an HMD of the user or to a computing device connected to the HMD.

According to some embodiments, certain areas or regions, or generally, real world objects, may be visually modified for the VR presentation. In one embodiment, the visual modification includes reskinning real world objects such as advertisements. Reskinning includes processes that overlay new content on top of existing content or replace or integrate pixel data associated with new content in place of the pixel data associated with existing content within the video frames. Embodiments contemplated here may use either method of reskinning. As a result, remote spectators of real world events may be provided with reskinned content that is more attuned to their interests and free of content that is unwanted.

FIG. 1 is a conceptual illustration of an embodiment for delivering a virtual reality (VR) presentation 106 of an esports event 100 to a remote user 101 via HMD 102 and VR environment 104. The esports event 100 is shown to include a first team 112 and a second team 114 playing against each other in a multiplayer video game hosted by a local server 116. Team banners 120 and 122 are shown indicate which team is which. A real-time presentation 103 of the happenings of the video game is displayed on a main display 118 such as a jumbotron, and includes live video of the video game as it is being played from various points of view.

Each player in the esports event 100 is shown to have their own gaming station where they can interact with a monitor and input devices while playing the multiplayer game. Each gaming station also has an audience-facing panel that is shown to display a live portrait view of each player as they play the multiplayer game. Also shown in FIG. 1 are a pair of commentators 105 who may provide play-by-play and color commentary regarding the game and its players.

The esports event 100 is further shown to include a plurality of physical advertisements that are viewable by audience 132. The physical advertisements may include printed banner advertisements, projected advertisements, LED displayed advertisements and the like. For example, the esports event is shown to include a left-wall ad 124 for milk, a right-wall ad 126 for instant noodles, a stage-wall ad 130 for energy drinks, and a commentator desk ad 128 for gaming products.

The audience 132 is shown to include a plurality of seats facing the stage of the esports event 100. According to some embodiments, a remote user 101 is able to choose a particular seat of the plurality of seats for the VR presentation 106 of the esports event 100. In the embodiment shown, the user 101 has chosen seat 134 having a point of view 136 from which to view the esports event 100 via the VR presentation 106. As will be described in more detail below, the point of view 136 of seat 134 is provided by a real world capture system 138 having a plurality of cameras and microphones located at seat 134 to capture the esports event 100 from the point of view 136 of the seat 134.

HMD 102 is shown to have access to the esports event 100 through a VR hosting server 107. The VR hosting server 107 receives real world data and game state data provided by the local server 116 for processing a VR presentation. For example, video game data such as game state information of the video game, as well as the video scenes of the video game being rendered from different points of view may be provided to VR hosting server 107 for processing. Moreover, real world data captured by the real world capture system 136 may be routed by local server 116 to the VR hosting server 107 for processing. In some embodiments, there may be plurality of real world capture systems for capturing real world data from a plurality of vantage points within esports event 100. As a result, a different server or plurality of servers may be used for serving real world data captured by the plurality of real world capture systems to remote users that is distinct from local server 116 for hosting the multiplayer video game.

The VR presentation 106 of the esports event 100 is shown to be from a point of view or vantage point of the seat 134 selected by remote user 101. As a result, the VR presentation 106 may provide a visual and audio experience of the esports event 100 as if remote user 101 were located at seat 134. In some embodiments, the real world capture system 138 is able to provide a 360 degree view of the esports event 100 and the physical space surrounding it such that the remote user 101 is also able to have a 360 degree view of the esports event 100 by moving turning their head or body. As a result, the remote user 101 is provided with an immersive VR presentation 106 of the esports event 100 that current esports broadcasts are unable to provide because the remote user 101 is provided with an experience as if they were inside the arena hosting the esports event 100.

According to the embodiment shown in FIG. 1, a number of modifications have been made to the VR presentation 106 that differs from the real world data captured by the real world capture system 138. For example, the left-wall ad for milk 124 has been reskinned to be a left-wall ad 124' for PlayStation in the VR presentation. Likewise, the right-wall ad 126 for instant noodles in the real world space appears to remote user 101 as a right-wall ad 126' for Farpoint. Moreover, the stage-wall ad 136 and the commentator desk ad 128 have been reskinned to display ad content that is different than that of the real world space. Each of the reskinned ads 124'-130' is shown to keep their perspective, size, and geometric proportions in the VR presentation 106 relative to that in the real world with respect to the point of view of the seat 134 and the real world capture system 138. For example, left-wall ad 124' appears to the user 101 with the same perspective as left-wall ad 124 would if the VR presentation 106 were to occur without reskinning.

As mentioned earlier, reskinning may involve overlaying replacement content on top of existing content by inserting frames into a video stream having the existing content such that the new content is displayed instead of the existing content. In other embodiments, reskinning may involve replacing, blending, or integrating new pixel data associated with the new content into the existing pixel data associated with the existing content.

Moreover, it is envisioned that reskinning existing content with new content involves analyzing a perspective of the existing content such that the new content is reskinned having the same or similar perspective. In some embodiments, a method or system may gather data regarding the real world coordinates of each of the vertices of the existing content as well as real world coordinates of the real world capture system (e.g., the camera capturing the existing content). In these embodiments, a perspective of the existing content may be determined based on the gathered coordinates. For example, the vertices of the new content may be placed virtually in 3-dimensional space to match the coordinates of the vertices of the existing content and projected back into 2-dimensional space. The resulting 2-dimensional projection of the new content will have the same or a similar perspective as the existing content. In other embodiments of reskinning, reskinning may occur in 2-dimensional space by distort transforming or perspective distorting new content to occupy the same 2-dimensional area as the existing content within a video image.

Moreover, it is contemplated that reskinning used with the methods and systems presented here are enabled to dynamically reskin existing content that moves in relation to a camera point of view. For example, an object moving in the real world may be reskinned by tracking the object in each of the video frames and performing the reskinning on the object within the video frames. As the object moves, a perspective of the object may change as well. The reskinning methods contemplated here are able to track these changes in real time and reskin new content according to the changing perspective.

In other embodiments, the real world capture system may move within the real world space. Thus, even if real world objects are stationary in the real world, a perspective of a real world object will change while the camera moves. Methods and systems contemplated here are able to reskin real world objects according to a changing perspective as a camera of a real world capture system moves about the real world. Similar to reskinning a moving object, reskinning a stationary object for a moving camera point of view involves tracking an object over a series of video frames and overlaying or replacing existing image data associated with existing content with new image data associated with new content.

In some embodiments, existing content (e.g., real world ads) may be automatically identified using classifiers, object recognition, character recognition, and artificial intelligence. In these embodiments, existing content automatically identified are tagged to be replaced by a reskinning logic. For example, the VR hosting service may be instructed to identify and reskin a particular brand of beef jerky automatically ever time indicia of that brand is captured. It is envisioned that the VR hosting service may be enabled to automatically reskin indicia of the brand of beef jerky for the eventual VR presentation.

In some embodiments, the content used for reskinning (e.g., "PlayStation," "FarPoint," etc.) may be based upon user preferences, user settings, user demographic, user browsing history, user shopping history, user viewing history, and the like. As a result, the remote user 101 may be provided with advertisement content that matches the interest of the remote user 101 in a way that does not distract from VR presentation 106 of the esports event 100.

Figure 2:
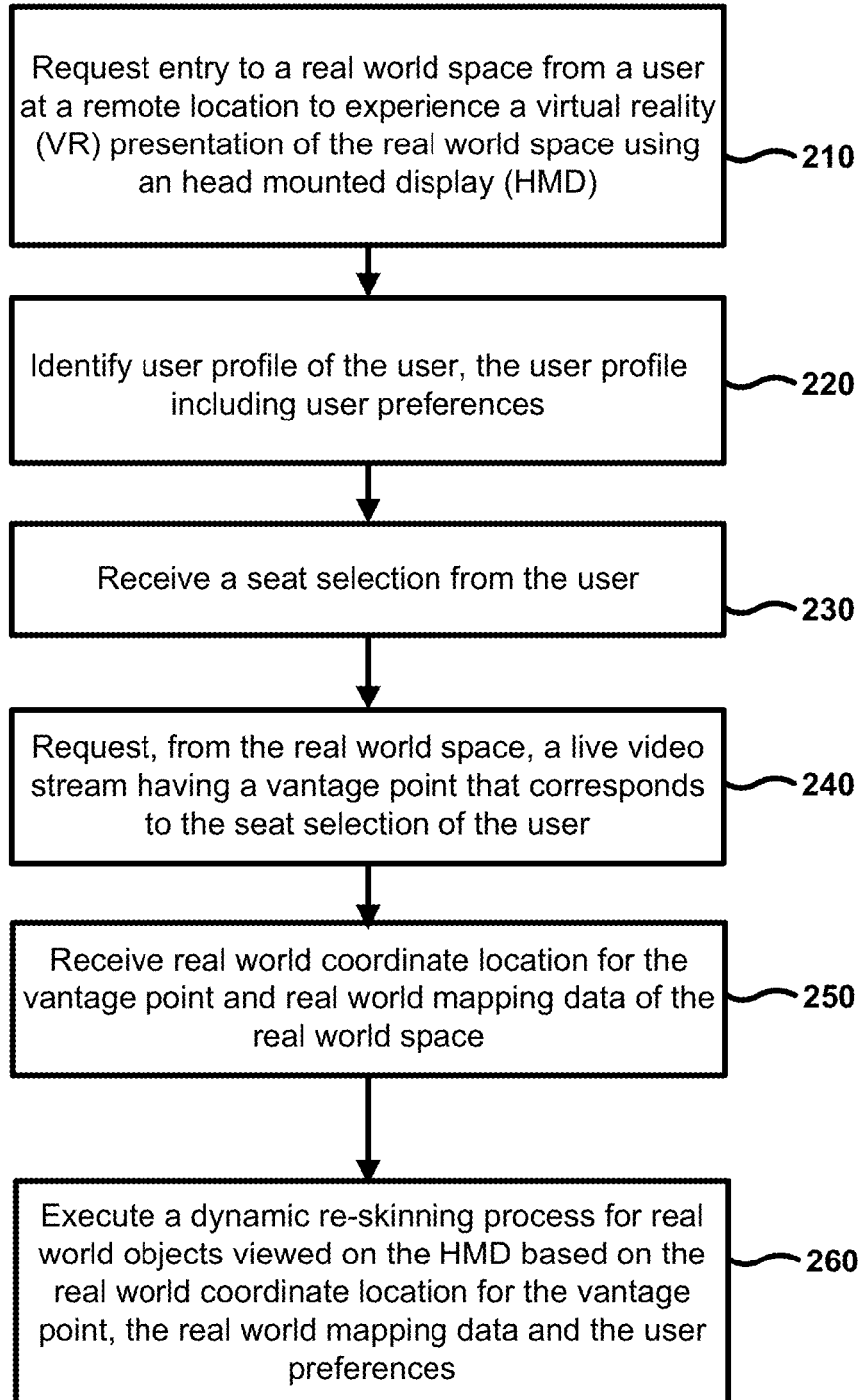
FIG. 2 shows an overall flow of a method for reskinning a VR presentation of a real world space according to one embodiment.

FIG. 2 shows an overall flow of a method for reskinning a VR presentation of a real world space according to one embodiment. The method includes an operation 210 to request entry to a real world space from a user at a remote location to experience a VR presentation of the real world space using an HMD. The method then flows to operation 220, which serves to identify a user profile of the user, the user profile including user preferences. In some embodiments, the use profile and the user preferences may include data on user interest, user demographic, user shopping history, user browsing history, user viewing history, as well as social network data on social friend activity, interests, and the like. As a result, the method may be enabled to learn of products, services, events, etc., that are of interest to the remote user.

In operation 230, the method receives a seat selection from the user. As will be discussed in more detail below, the user may be offered a plurality of seats that correspond to real world locations in the real world space for viewing real world action. Different seats may provide different VR presentations due to the different seats having a different point of view or vantage point of the real world action. In some embodiments, different seats may be priced at different values. For example, the best seat in the house that is front and center of the stage may have a higher price or requirement than a seat that is located farther away from the stage.

In operation 240, the method requests a live video stream having a vantage point that corresponds to the seat selection of the remote user. As shown in FIG. 1, the live video stream may be provided by a real world capture system having a plurality of cameras and microphones. The method then flows to operation 250, which serves to receive real world coordinate location for the vantage point. Thus, for example, operation 250 may obtain real world coordinate location of the real world capture system shown in FIG. 1. Additionally, the method is able to obtain real world mapping data of the real world space, which may include real world coordinates of objects within the real world space. For example, if the real world space is an arena having a stage, the real world mapping data may provide information on where the stage is relative to the vantage point.

The method then flows to operation 260, which serves to execute a dynamic reskinning process for real world objects viewed on the HMD based on the real world coordinate location for the vantage point, the real world mapping data, and the user preferences. The real world objects used for dynamic reskinning may include any object in the real world, such as advertisements, banners, displays, surfaces, patches, floors, ceilings, electronic devices, etc.

Figure 3:
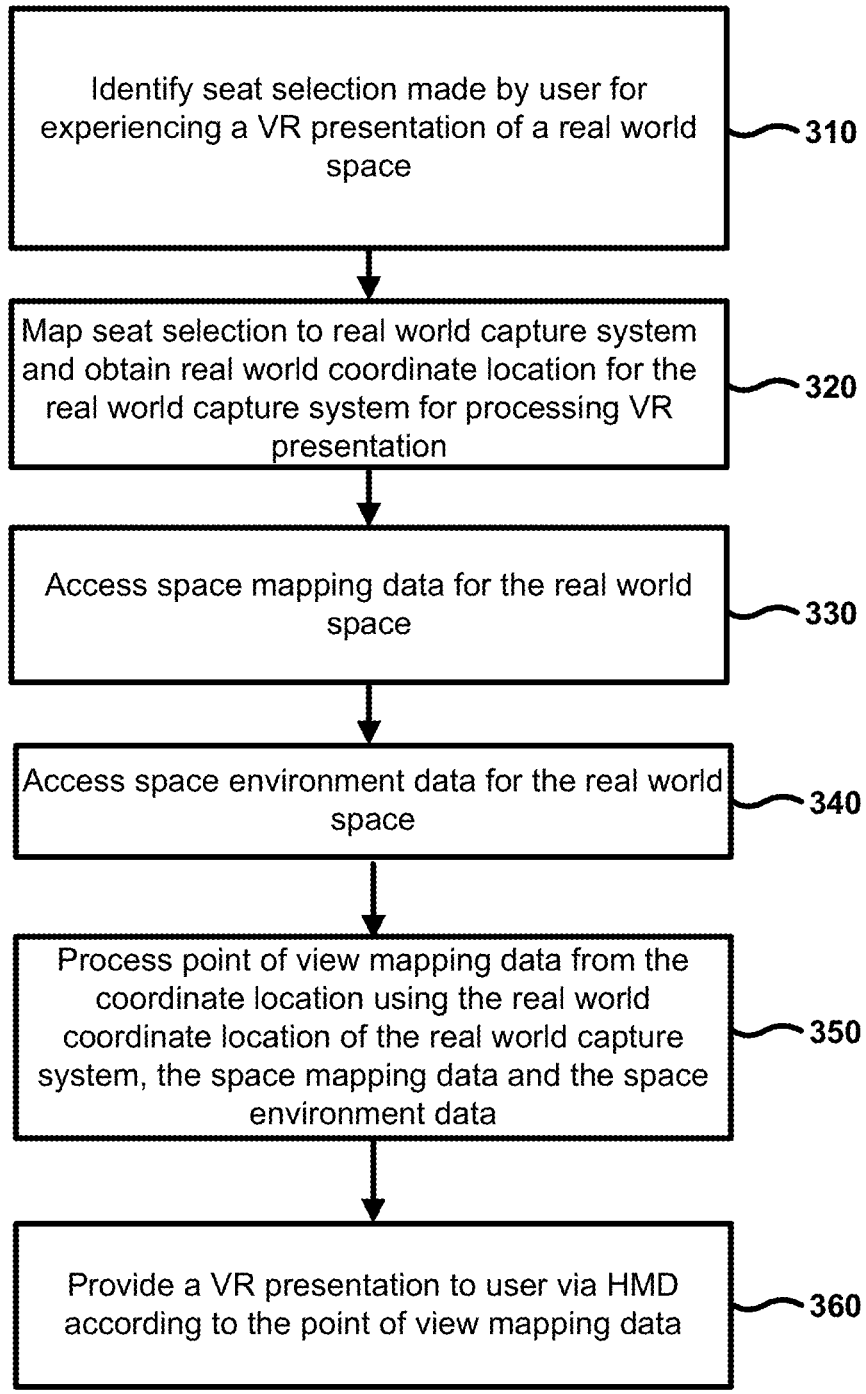
FIG. 3 shows an overall flow of a method for using data gathered from the real world space to provide a VR presentation of a real world space having a point of view corresponding to a seat selection made by a user, according to one embodiment.

FIG. 3 shows an overall flow of a method for using data gathered from the real world space to provide a VR presentation of a real world space having a point of view corresponding to a seat selection made by a user, according to one embodiment. Operation 310 identifies a seat selection made by the user for experiencing a VR presentation of a real world space. The method then flows to operation 320, which serves to obtain real world coordinate location for the seat selection for processing the VR presentation. The process for obtaining real world coordinates for the seat selection may involve mapping the seat selection to a real world capture system located in the real world that corresponds to the seat selection.

In some embodiments, a seat selecting process is similar to selecting seats for live events where a ticket buyer is provided with an option to buy tickets for particular seats within an arena. Thus, each seat selection maps to a real world seat in the real world space. In some embodiments, for every seat selection, there is a distinct real world capture system that captures events in the real world from a location that corresponds to the seat selection. In these embodiments, the real world coordinates for the real world seat will be similar to the real world coordinates of the real world capture system. In other embodiments, there may be two or more seat selections that map to the same real world capture system. As a result, the method will obtain the real world coordinates of the real world capture system for purposes of processing the VR presentation. In other embodiments, there may be a combination of one-to-one mapping and many-to-one mapping of seat selections to real world capture systems. Operation 320 is able to map the seat selection to a real world capture system that is the best fit in terms of proximity, viewing angle, etc. relative to the seat selection.

If the seat selection is for a seat in an auditorium or arena for hosting an esports event, the real world coordinate location of the real world capture system obtained by operation 320 help to identify where the real world capture system is relative to objects in the auditorium or arena. For example, a seat selection of AA01 may be mapped to a real world capture system that has a real world coordinate location of (x, y, z) within a coordinate system of the auditorium or arena.

Operation 330 is configured to access space mapping data for the real world space. Space mapping data may include a virtual map of the physical space in terms of the coordinate system of the auditorium or arena mentioned above. The space mapping data generally helps identify locations of objects, walls, floors, ceilings, seats, stages, etc. Again, if the real world space is an auditorium or arena hosting an esports event, the space mapping data may include coordinate data of the esports players, the commentators, the main display, the stage, advertisements, and other points of interest.

In operation 340, the method accesses space environment data for the real world space from the real world capture system that the seat selections maps to. Space environment data may include any type of data capable of being captured by the real world capture system. For example, as mentioned above, a real world capture system may include an array of cameras, microphones, and other sensors for measuring distances of objects. As a result, space environment data may include data gathered from a sound calibration process that detects acoustics properties of the auditorium relative to the position of the real world capture system. The acoustic properties detected may include directional acoustic reflectance, impedance, gain, harmonics, background or ambient noise, etc.

The space environment data obtained by operation 340 may also include measurements of distances between the real world capture system and various objects within the real world space. Angular distances between rays traced to vertices of real world objects such as corners of a large advertisement within the real world space may also be measured. For example, the space mapping data may be able to determine coordinate location of each of the four vertices of a large rectangular advertisement in the real world space. As a result, the space environment data may be usable to construct a 3-D model real world objects in the real world space.

In operation 340, data gathered from operation 320 (e.g., real world coordinate location for the real world capture system), operation 330 (e.g., space mapping data), and operation 340 (e.g., space environment data) are used to process point of view mapping data. Point of view mapping data may include data that is relevant to processing a VR presentation of the real world space as well as reskinning of real world object for the VR presentation. For example, point of view mapping data may include distances measured to real world objects, angular distances of rays traced to vertices of real world objects, real world coordinates of real world objects (e.g., coordinates of real world objects independent of the real world capture system), camera coordinates of real world objects (e.g., coordinates of real world objects relative to the real world capture system). In addition, the point of view mapping data may also include data on the acoustic properties of the real world space at the location of the real world capture system.

The method shown in FIG. 3 then flows to operation 360, which provides the VR presentation of the real world space to the user via an HMD according to the point of view mapping data processed by operation 350. The VR presentation may include live audio and video streams captured by the real world capture system. In certain embodiments, the VR presentation may include modified versions of the live audio and video streams according to the point of view mapping data. An example of modifying the audio stream includes mixing various audio inputs such audio captured at the real world capture system with audio associated with the audience, players, commentators, game sounds, etc. An example of modifying the video stream includes reskinning a real world object such as a large rectangular ad to appear as a large rectangular ad for something else in the VR presentation.

Figure 4:
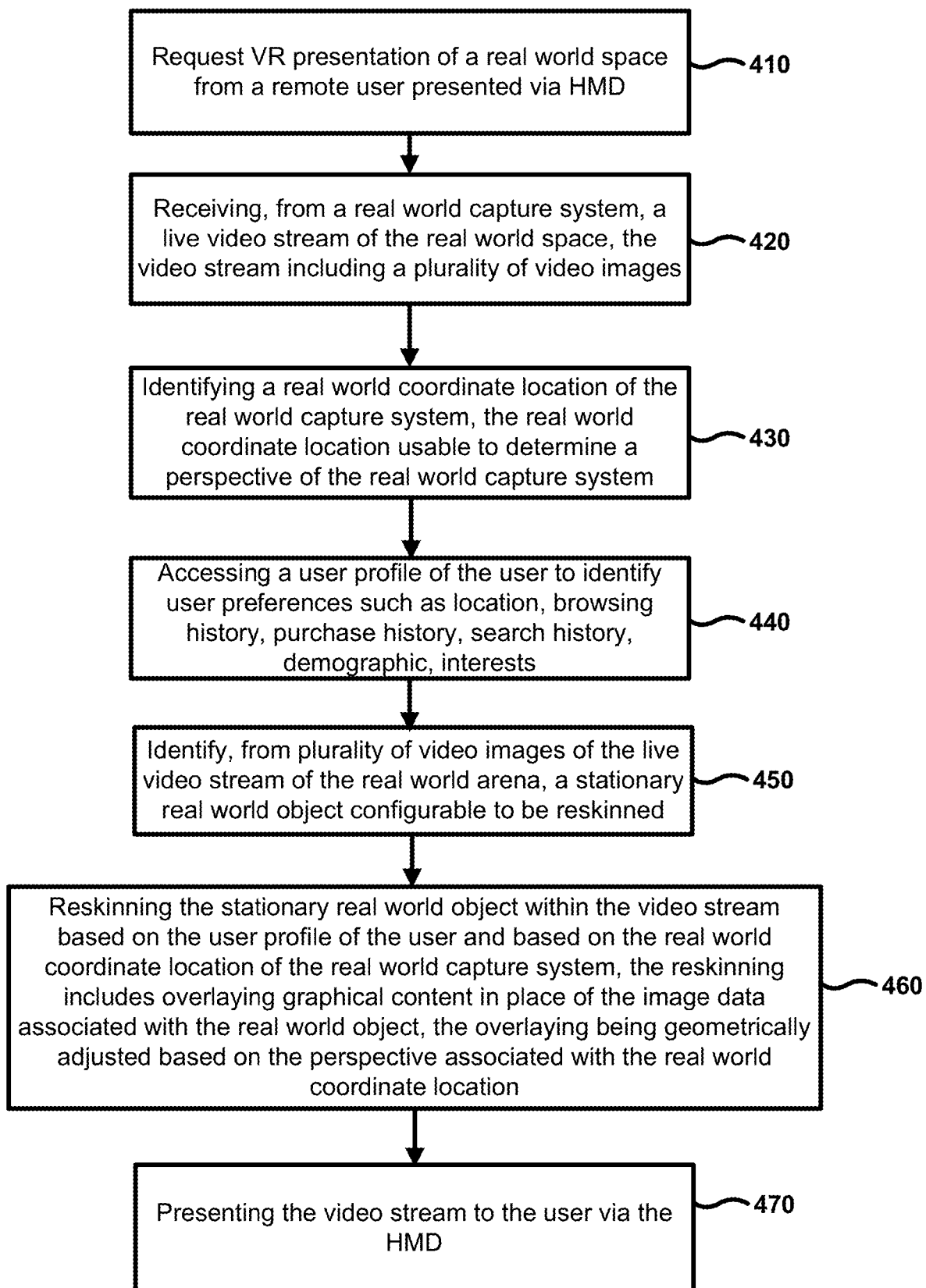
FIG. 4 shows an overall flow for reskinning a static real world object of a real world space during VR presentation of the real world space, according to one embodiment.

FIG. 4 shows an overall flow for reskinning a static real world object of a real world space during VR presentation of the real world space, according to one embodiment. The method begins with operation 410 for requesting a VR presentation of a real world space from a remote user via HMD. The method then flows to operation 420 for receiving, from a real world capture system, a live video stream of the real world space, the video stream including a plurality of video images. If the real world space is an arena hosting an esports event, the video stream may include video of the players of each team, a main display of the video game, other spectators, commentators, advertisements, etc. As mentioned above, the video feed may include a 360 degree horizontal view of the real world space that allows an HMD user receiving the video feed to look around in 360 degrees by turning their head or body. In other embodiments, a 360 degree vertical view of the real world space is also provided.

The method then flows to operation 430, which serves to identify real world coordinate location of the real world capture system, the real world coordinate location usable to determine a perspective for the real world capture system. For example, by having the real world coordinates of the real world capture system, the method is able to analyze the perspective associated with various real world objects or scenes captured by the real world capture system. In one example, if real world coordinate are known for the vertices of a large rectangular advertisement in the real world space, then the method may use the real world coordinate (e.g., x, y, z) of the real world capture system to determine a perspective associated with the advertisement when captured by the real world capture system.

In operation 440, the method accesses a user profile to identify preferences such a location, browsing history, purchase history, search history, demographic and interest. In operation 450, the method identifies, from the plurality of video images of the live video stream of the real world arena, a stationary real world object configurable to be reskinned. For example, operation 450 may identify that a large rectangular advertisement is configurable to be reskinned with some other content. There are any number of types of static real world objects and portions of real world objects that may be configurable to be reskinned. For example, portions of walls, curtains, displays, gaming stations, portions of the stage, etc. may all be configurable to be reskinned as static real world objects. It will be appreciated that a real world object that is configurable to be reskinned is also taken to mean portions of real world object that are configurable to be reskinned.

The method then flows to operation 460, which serves to reskin, based on the user profile of the user and based on the real world coordinate system of the real world capture system, the stationary real world object within the live video stream. In the embodiment shown, the reskinning includes overlaying graphical content in place of the image data associated with the real world object in the live video stream. Moreover, it is shown that the overlaying is to be geometrically adjusted based on the perspective associated with the real world coordinate location of the real world capture system.

For example, if a large rectangular ad is identified by operation 450 as a stationary real world object configurable to be reskinned, then operation 460 would be operable to identify a graphical content element that is of interest to the user for reskinning, for example, an ad for sneakers. Operation 460 is able to overlay the ad for sneakers in place of the image data associated with the large rectangular ad, for example, by creating new video stream having the ad for sneakers in place of the pixel values that were previously associated with the large rectangular ad. Moreover, it is contemplated that the ad for sneakers is to be adjusted geometrically based on the perspective of the real world capture system. For example, if the large rectangular ad appears askew from the perspective of the real world capture system, the replacement graphical content of the ad for sneakers will also be made to appear skew in a similar way as the large rectangular ad. Operation 470 then presents the modified video stream having the real world objects being reskinned.

Figure 5:
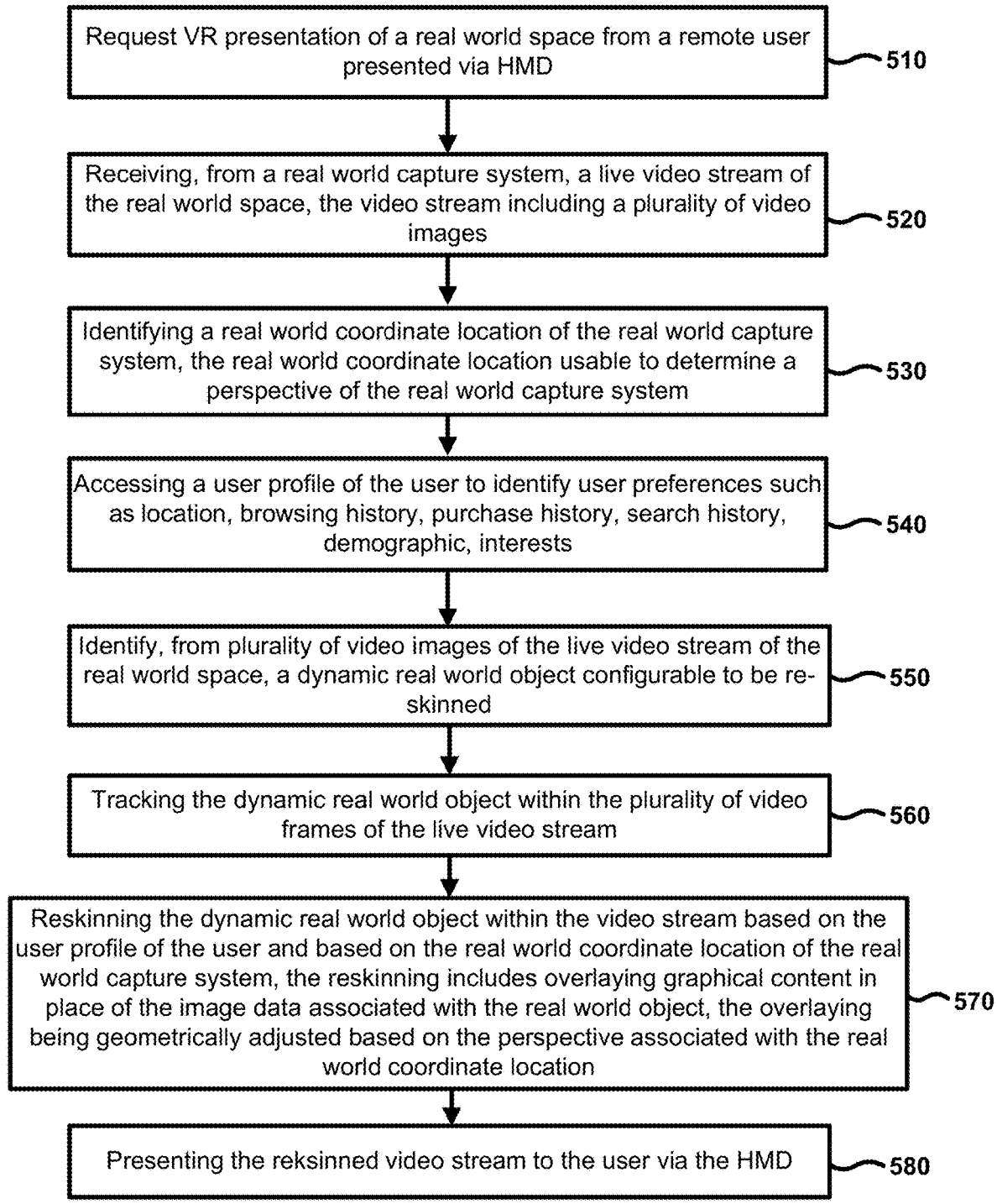
FIG. 5 shows an overall flow for reskinning a moving real world object of the real world space during VR presentation of the real world space, according to one embodiment.

FIG. 5 shows an overall flow for reskinning a moving real world object of the real world space during VR presentation of the real world space, according to one embodiment. The method proceeds similar to the method shown in FIG. 4. For example, operations 510 and 520 are configured to respectively request a VR presentation of a real world space from a remote user presented via HMD and to receive a live video stream of the real world space from a real world capture system.

In operation 530, the method identifies a real world coordinate location of the real world capture system for determining a perspective of the real world capture system. In operation 540, the method accesses a user profile of the user to identify user preferences such as location, browsing history, purchase history, search history, demographics, interests, etc. In operation 550, the method identifies a dynamic object configurable to be reskinned from a plurality of video images of the live video stream of the real world space.

The method of FIG. 5 then flows to operation 560, which serves to track the dynamic object within the plurality of video frames of the live video stream. A dynamic real world object that is configurable to be reskinned may include attire that players or spectators are wearing, furnishings, and other gear that tend to move within the physical space. Operation 560 is configured to track their movements for reskinning in later operations.

Operation 570 of the method allows for the reskinning of the dynamic real world object within the video stream based on the user profile of the user and based on the real world coordinate location of the real world capture system. According to the embodiment shown, the reskinning includes overlaying replacement graphical content in place of image data associated with the real world object, wherein the overlaying is geometrically adjusted based on the perspective of the real world coordinate location of the real world capture system. In operation 580, the method presents the reskinned video stream to the user via the HMD.

Figure 6:
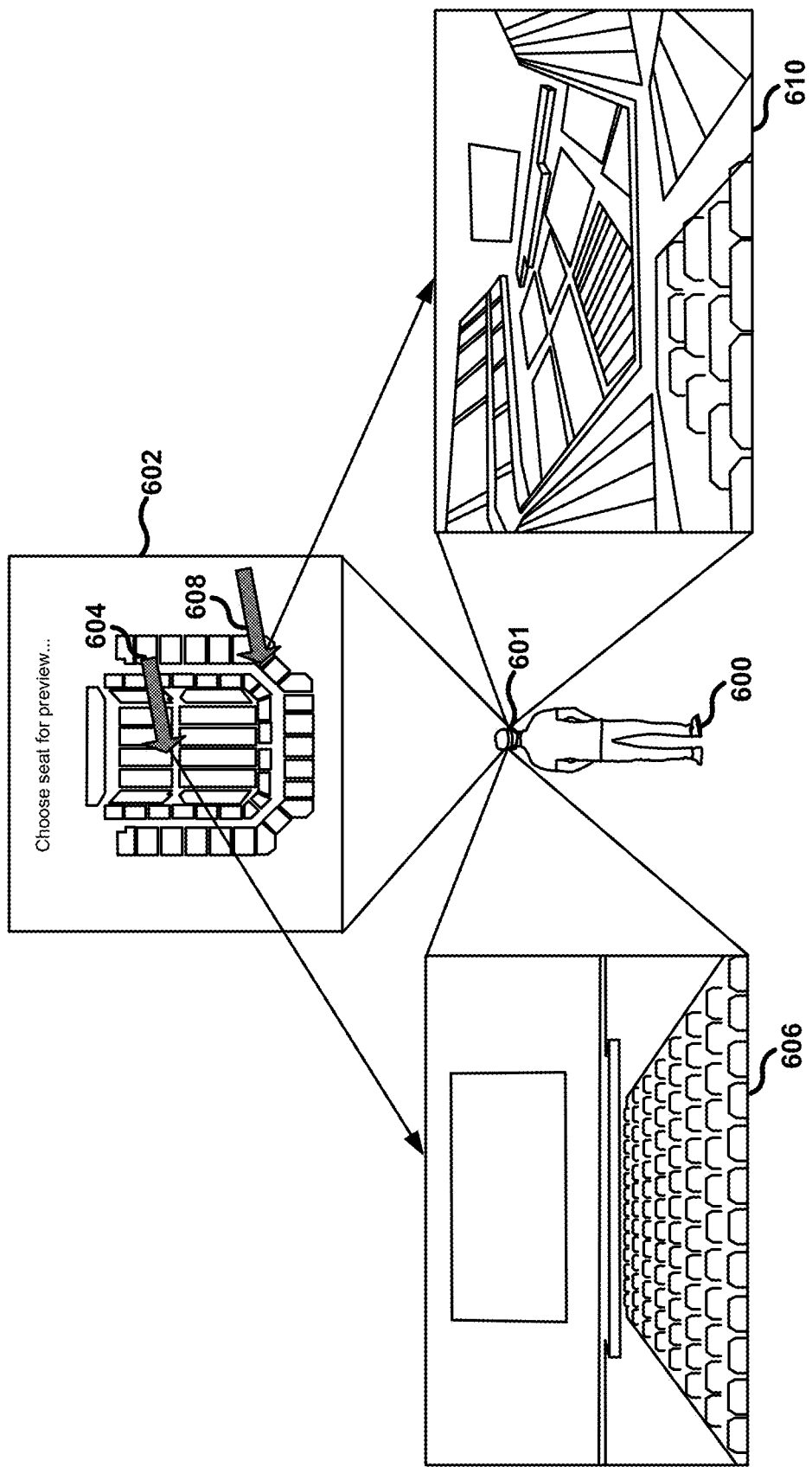
FIG. 6 shows a conceptual illustration of a remote spectator making a seat selection for viewing a live event via an HMD, according to one embodiment.

FIG. 6 shows a conceptual illustration of a remote spectator 600 making a seat selection for viewing a live event via an HMD 601, according to one embodiment. The remote spectator 600 is shown to be provided with a seat selection interface 602 that is viewable with the HMD. The seat selection interface 602 is able to convey auditorium and seat information to the user. In some embodiments, the seat selection interface 602 is also able to convey price information of each seat for a VR presentation of a real world event.

According to FIG. 6, the remote spectator 600 is able to preview various seats shown in the seat selection interface 602. For example, the remote spectator 600 is shown to make a first selection 604 for a seat that is toward the front of the auditorium. The seat selection interface 602 may then provide a first preview 606 that includes a VR scene of the auditorium from the seat corresponding to the first selection 604. Likewise, when remote spectator 600 makes a second selection 608 that is in the balcony of the auditorium, the seat selection interface 602 may then provide a second preview 610 including a VR scene of the auditorium from the seat corresponding to the second selection 618. It is contemplated that for some embodiments the first and second previews 606 and 610 may be immersive VR views having a 360 degree view.

Figure 7:
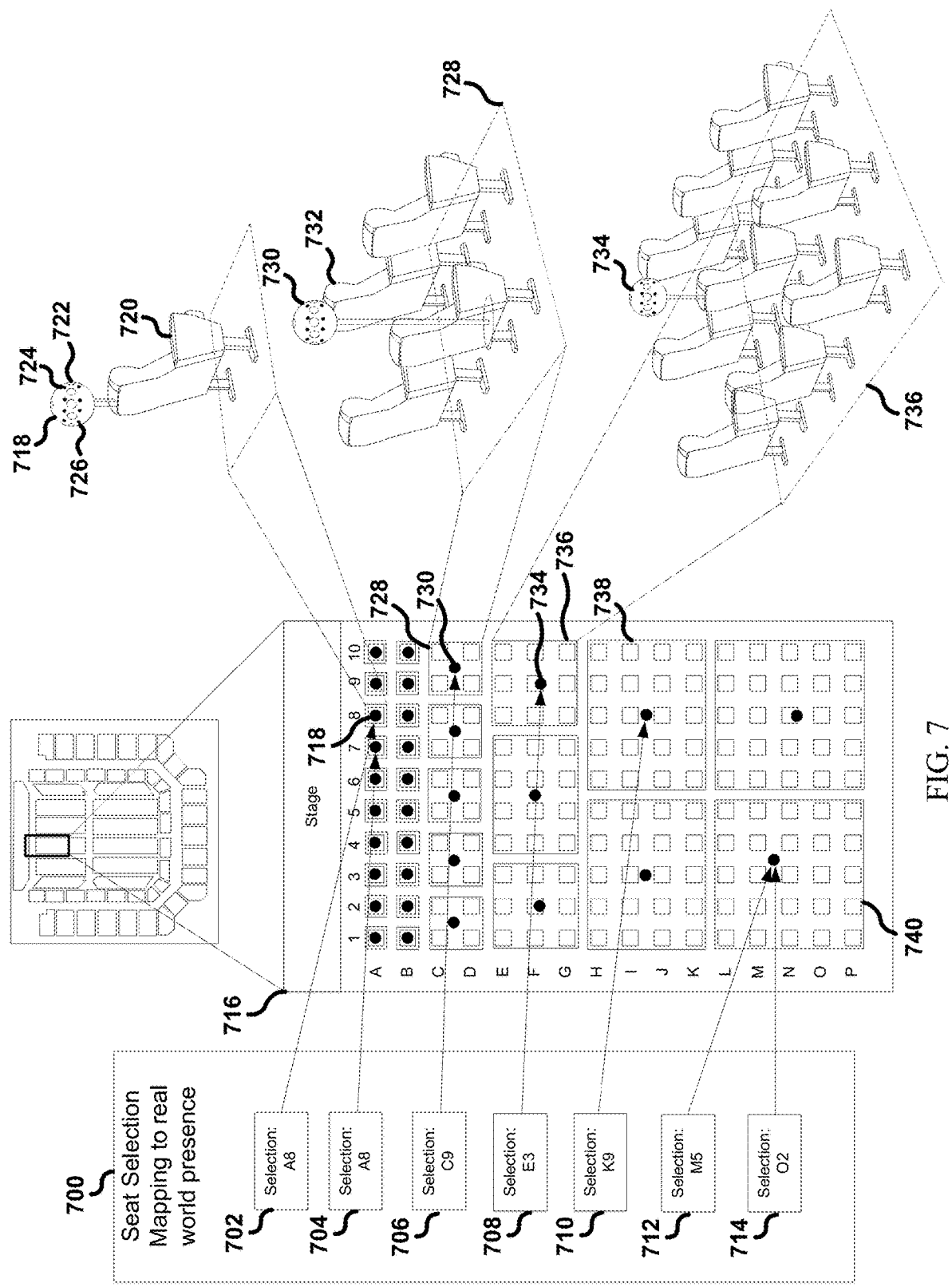
FIG. 7 shows a conceptual illustration of a process that maps a remote spectator's seat selection to a real world capture system, the real world capture system including a plurality of cameras and microphones for capturing events in the real world, according to one embodiment.

FIG. 7 shows a conceptual illustration of a process that maps a remote spectator's seat selection to a real world capture system. Example seat selections 700 are shown to be mapped to various real world capture systems represented by black dots in a seat mapping chart 716. For example, selection 702 for seat A8 is shown to map to real world capture system 718. Real world capture system 718 is shown to be mounted on top of the back rest of real world seat 720 corresponding to selection 702 for seat A8. As a result, real world capture system 718 provides a view within the real world space that is similar to a view a person would have sitting in seat 720.

The real world capture system 718 is shown to include an array of cameras 722 for capturing a 360 degree view of the real world, an array of microphones 724 for capturing sounds originating from various directions, and an array of sensors 726 for sensing environmental data.

The seat mapping chart 716 of FIG. 7 illustrates how seat selections 700 are mapped to various real world capture systems. For rows A and B, there is a one-to-one mapping of a seat selection to a distinct real world capture system. That is, every seat selection from rows A and B maps to its own real world capture system. For example, selection 704 for seat A8 maps to a real world capture system that is specific to seat A8 and distinct from that of seat A9. For rows C and D, however, the seat mapping chart 716 shows that a group of four seat selections are mapped to one real world capture system. For example, a group 728 of four seats (e.g., C9, C10, D9, and D10) each map to one real world capture system. Thus, for example, a selection 706 for seat C9 may be mapped to real world capture system 730, as would a selection for seats C10, D9, and D10. According to the embodiment shown, the real world capture system 730 is placed at a position that is in between or an average of the locations of each of seats C9, C10, D9, and D10. In other embodiments, however, this need not be the case.

Seat selection 708 for seat E3 is shown to be mapped to real world capture system 734, which is associated with a group 736 of nine seats. The real world capture system 734 is thus shown to be mounted on top of seat F9, which closest to an average of the locations of each of the seats in group 736.

The seat selection chart 716 shows groups of various sizes. For example, selection 710 is shown to map to a real world capture system that is associated with a group 738 spanning 4 rows and 5 columns of seats. Moreover, both of selections 712 and 714 are shown to map to a real world capture system associated with a group 740 having a 25 seats arranged in a 5 by 5 pattern. While certain groupings of seats have been shown in FIG. 7 for illustrative purposes, it is to be appreciated that any size or pattern of groupings may be utilized with the methods and systems presented here.

According to various embodiments, the real world capture systems 718, 730, and 734 may be enabled to provide feedback signals to the real-world audience such that the real-world audience is made aware that one or more virtual spectators are connected. For example, each of the real world capture system 718, 730, and 734 may include feedback system such as one or more LEDs (not shown) for delivering feedback from the virtual spectators. In some embodiments, the feedback system may include an array of LEDs that are configured to display a representation of feedback obtained from one or more virtual spectators for the real world spectators. In these and other embodiments, the real world capture systems 718, 730, and 734 may also include speakers (not shown) that are configured to deliver sounds from the virtual spectators to the real world spectators. As a result, the virtual spectators are able to express their feedback to the real world space, which may reinforce the response and excitement of the real world arena.

In certain embodiments, the feedback system may be configured to identify and convey the intensity and directionality of the virtual spectator feedback. As an example, if a virtual spectator begins to clap, his or her clapping may be represented by a dynamic pattern that is displayed via an array of LEDs. The intensity of his or her clapping may be represented by displaying various colors or patterns of movement within the array of LEDs. In some embodiments, more than one virtual spectator may be connected to a real world capture system at any given moment. In these embodiments, the intensity and pattern of feedback may be correlated with the average reaction or response of the two or more virtual spectators that are connected to the real world capture system. For example, if ten or more virtual spectators connected to the same real world capture system provide an applause reaction, a pattern such as a starburst may appear on a display mechanism of the real world capture system. As a result, the real world audience is provided with feedback from the virtual spectators that is indicative of the number of virtual spectators that are connected to real world capture system in addition to the nature of the response or reaction of the virtual spectators.

Figure 8:
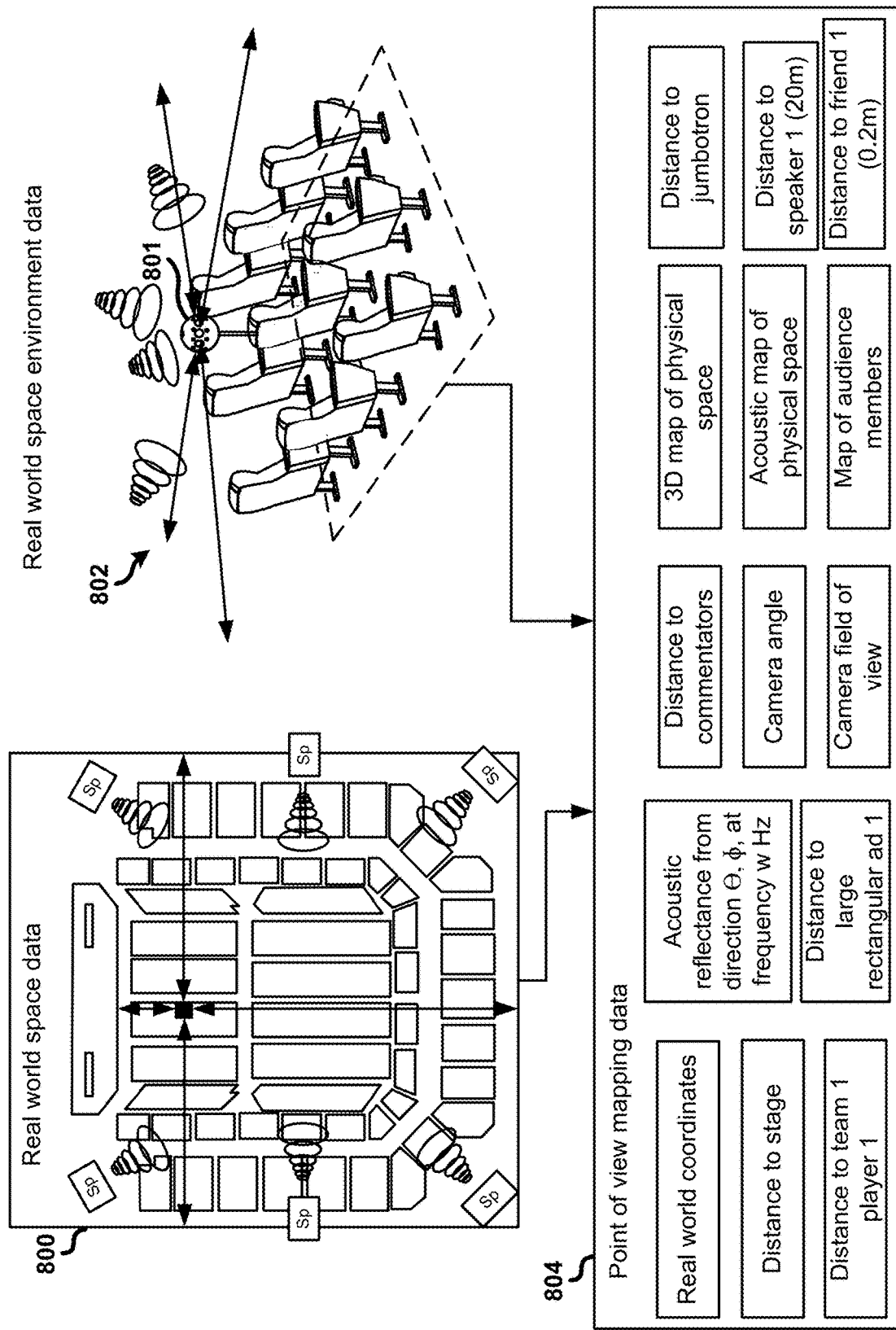
FIG. 8 shows a conceptual illustration of obtaining point of view mapping data associated with the real world capture system from real world space data and real world environment data, according to one embodiment.

FIG. 8 shows a conceptual illustration of obtaining point of view mapping data associated with the real world capture system from real world space data and real world environment data, according to one embodiment. Real world space data 800 is shown to include mapping data of real world objects within the real world space. For example, real world space data 800 may include coordinate locations of various real world objects in the physical environment. In the embodiment shown, the real world space may be the Bill Graham Civic Auditorium and the real world space data may include the coordinate locations of the stage, the walls, steps, walkways, the balcony level of the auditorium, as well as various points of interest for a given real world event held in the auditorium.

The real world space environment data 802 is shown to be captured by a real world capture system 801, which captures environmental data for the point of view of the seat or group of seats associated with the real world capture device 801. As mentioned above, the real world capture device 801 may include an array of microphones, cameras, and sensors.

FIG. 8 shows that the real world space data 800 and the real world environment data 802 may be combined to provide point of view mapping data 804. Point of view mapping data 804 is shown to include real world coordinates, a distance to the stage (e.g., 20 meters), a distance to player 1 of team 1 (e.g., 25 meters), an acoustic reflectance of a direction 0, 4), at w Hertz, a distance to a large rectangular ad, a distance to the commentators, a camera angle, a camera field of view, a 3D map of the physical space, an acoustic map of the physical space, a map of audience members, a distance to the jumbotron, a distance to a speaker, and/or a distance to a friend who is present either in person or virtually in the real world space.

According to some embodiments, the point of view mapping data 804 uses real world space data 800 and real world space environment data 802 to construct camera coordinates of the real world and real world objects. For example, in some embodiments, point of view mapping data 804 is able to transform "world coordinates" provided by the real world space data into "camera coordinates" using real world environment data 802. As a result, the point of view mapping data 804 is enabled to use the camera coordinates of, for example, the large rectangular ad for reskinning purposes, as the point of view mapping data 804 will know how the large rectangular ad projects onto the camera during image capture of the real world space.

Figure 9:
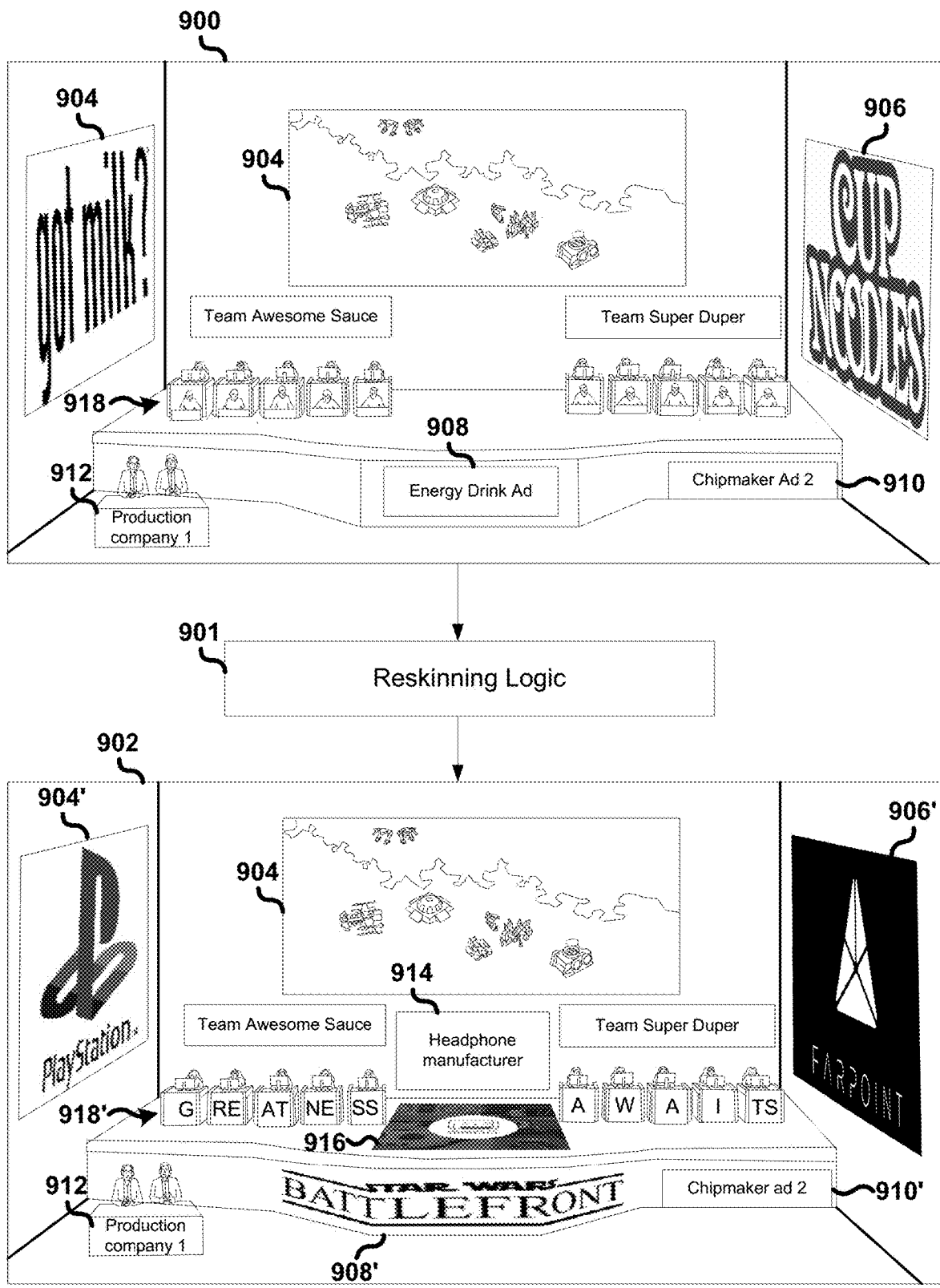
FIG. 9 shows a conceptual illustration of reskinning real world objects in a real world view of an esports event.

FIG. 9 shows a conceptual illustration of reskinning real world objects in a real world view of an esports event. A first view 900 that has not been reskinned is shown to capture an esports event. The view 900, for example, may be part of the video capture of a real world capture system. The first view 900 includes a plurality of advertisements placed on various surfaces that are viewable by the audience of the esports event. For example, first view 900 includes a left-wall ad 904 for milk, a right-wall ad for noodles, a first stage ad 908 for an energy drink, a second stage ad 910 for a chipmaker, and a commentator desk ad 912 for a production company. The view also includes a main display 904 of the video game action that is being played, as well as team banners.

The first view 900 is shown to be inputted into reskinning logic 901, which in turn is shown to output a second view 900 of the esports event having been reskinned. FIG. 9 demonstrates the graphical and visual capabilities of the reskinning logic. For example, the left-wall ad 904' for milk has been reskinned to appear as left-wall ad 904' for PlayStation. Likewise, the right-wall ad 906 for noodles and the second stage ad 910 are each shown to have been reskinned to appear as a right-wall ad 906' for Farpoint, and a second stage ad 910' for a different chipmaker. For each of ads 904', 906', and ad 910', the reskinning logic 901 has overlaid the replacement ads in a way that occupies the same space as the original ads 904, 906, and 910. Moreover, the reskinning logic 901 has performed the reskinning such that each of the replacement ads 904' 906' and 910' are drawn to provide the same perspective in the second view 902 as the respective original ads 904, 906, and 910 provided in the first view 900. For example, left-wall ad 904 appears in the first view 900 with a perspective having a skew. In the second view 902, the reskinning logic 901 overlays replacement left-wall ad 904' with a perspective having the same skew.

In addition to replacing or overlaying existing advertisements, the reskinning logic 901 is also able to detect additional real world objects such as portions of surfaces that may be reskinned with content. For example, back-wall ad 914 for a headphone manufacturer is shown to have been reskinned in a region that is without content in the first view 900. Likewise, stage-floor ad 916 is shown in the second view 902 in a region where there was no existing content in the first view 900 of the real world space. the stage-floor ad 916 is further shown to have been reskinned to have geometric and perspectival consistency with the stage floor as captured by first view 900 by the real world capture device. That is, the stage-floor ad 916 appears as though it has been laid down flat on the stage floor.

As a result, the reskinning logic 901 contemplated here is able to identify regions within the real world space as captured by the real world capture device where content may be augmented where no content exists in the real world space. The determination of whether and which regions within the real world space that may be augmented with additional content will depend upon the view received by each real world capture system. For example, a region within the real world space that is determined to be desirable for augmenting content where no content exists for a particular real world capture system may not be found to be desirable by a different real world capture system because of a difference in points of view.

While in some embodiments, the replacement content is made to occupy the same space as the original existing content, there are other instances where the replacement content has a display dimension and aspect ratio that is different than the existing content to be reskinned. For example, the first stage ad 908 for an energy drink is shown to have been reskinned with a replacement first stage ad 908' for Star Wars Battlefront that has a wider dimension. In the embodiment shown, replacement first stage ad 908' is appears in the second view 902 to be flush against the contours of the front of the stage instead of appearing to float in air. As a result, the reskinning logic 901 is able to reskin replacement content having different dimensions than the content to be replaced, while maintaining geometric and perspectival consistency with the real world object on which the replacement content is overlaid.

Moreover, it is contemplated that additional regions may be reskinned. For example, in the first view 900, each of the player gaming stations 918 is shown to display a live portrait of the respective player on a gaming station audience-facing display. The live portrait display provides an audience with a way to see the facial expressions of the players that are otherwise blocked from view by respective computer monitors. As will be discussed in more detail below, embodiments contemplated here enable the remote user to access these live portrait views of players without having to rely on the gaming station audience-facing displays, which may be hard to make out. Thus, in some embodiments, reskinning may also be performed on the audience-facing display of all or a portion of the gaming stations. For example, FIG. 9 shows that each of the player gaming stations 918 first view 900 has been reskinned by reskinning logic 901 to display letters reading "GREATNESS AWAITS" on the player gaming station 918' in the second view 902. Thus, it is contemplated that replacement content may be in the form of text in addition to graphical content such as ad graphics.

Under certain conditions, there may be original, existing ad content that may remain unchanged and not reskinned for a number or reasons. In the embodiment shown, the commentator desk ad 912 is shown to remain unchanged after the reskinning by the reskinning logic 901.

Figure 10A:
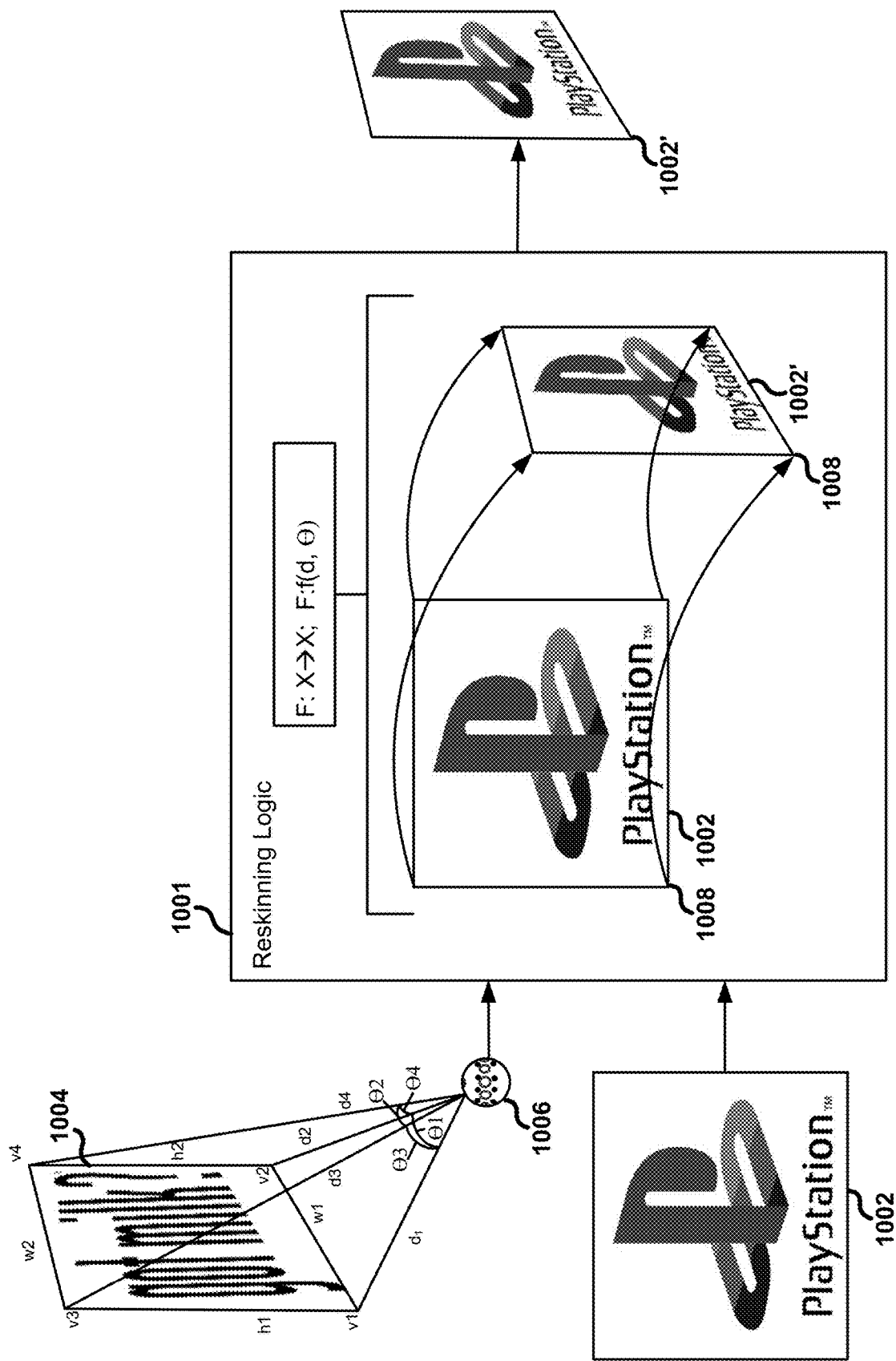
FIGS. 10A and 10B show conceptual illustrations of geometrically adjusting a graphical element for overlaying on top of an ad for reskinning based on the perspective of the real world capture system.

FIG. 10A shows a conceptual illustration of geometrically adjusting a replacement graphic 1002 for overlaying on top of a real world ad 1004 for reskinning based on the perspective of the real world capture system 1006. The real world capture system 1006 is shown to capture real world ad 1004 at a perspective that is not square or orthogonal to the plane of the real world ad 1004. It is contemplated that the real world capture system 1006 is enabled to determine distances (d: $d_1$, $d_2$, $d_3$, and $d_4$) to of the vertices, $v_1$, $v_2$, $v_3$, and $v_4$, of the real world ad 1006, as well as the angles (θ: $θ_1$, $θ_2$, θ3, and θ4) formed between rays traced to each of the vertices. Based on d and θ, the reskinning logic is able to transform various graphical elements using a transform function to appear similar to the real world ad from the perspective of the real world capture system 1006.

The reskinning logic 1001 is shown to include a transform function F that is a function of d and θ, that maps image data from a set X to itself in either 2-dimensional space or 3-dimensional space. In the embodiment shown, replacement graphic 1002 is shown to be inputted into reskinning logic, which maps pixel data associated with the replacement graphic 1002 to new pixel coordinates in the modified replacement graphic 1002. As a result, the modified replacement graphic 1002 will be made to appear with the same perspective as the real world ad 1004 in a VR presentation.

Figure 10B:
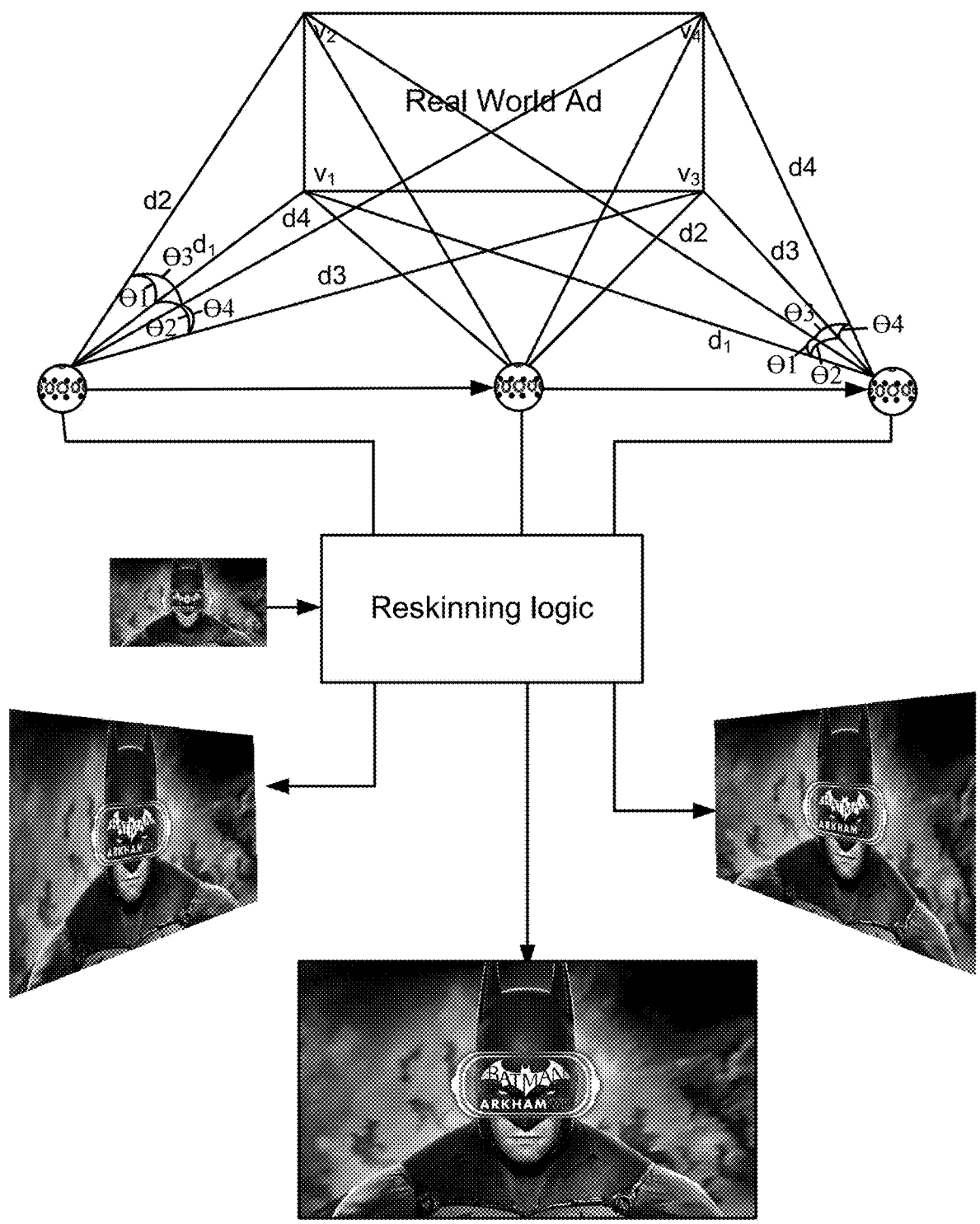

FIG. 10B shows an embodiment of reskinning a real world object while the point of view of a real world capture device is changing. For example, the real world capture device is shown to travel longitudinally from a point of view that is left of the real world object to a point of view that is to the right of the real world object. During its movement, the reskinning logic updates the parameters used for transforming and geometrically an input graphic. As a result, the reskinning logic is able to output varying perspectives of the input graphic depending on the current position and point of view of the real world capture device.

Figure 11:
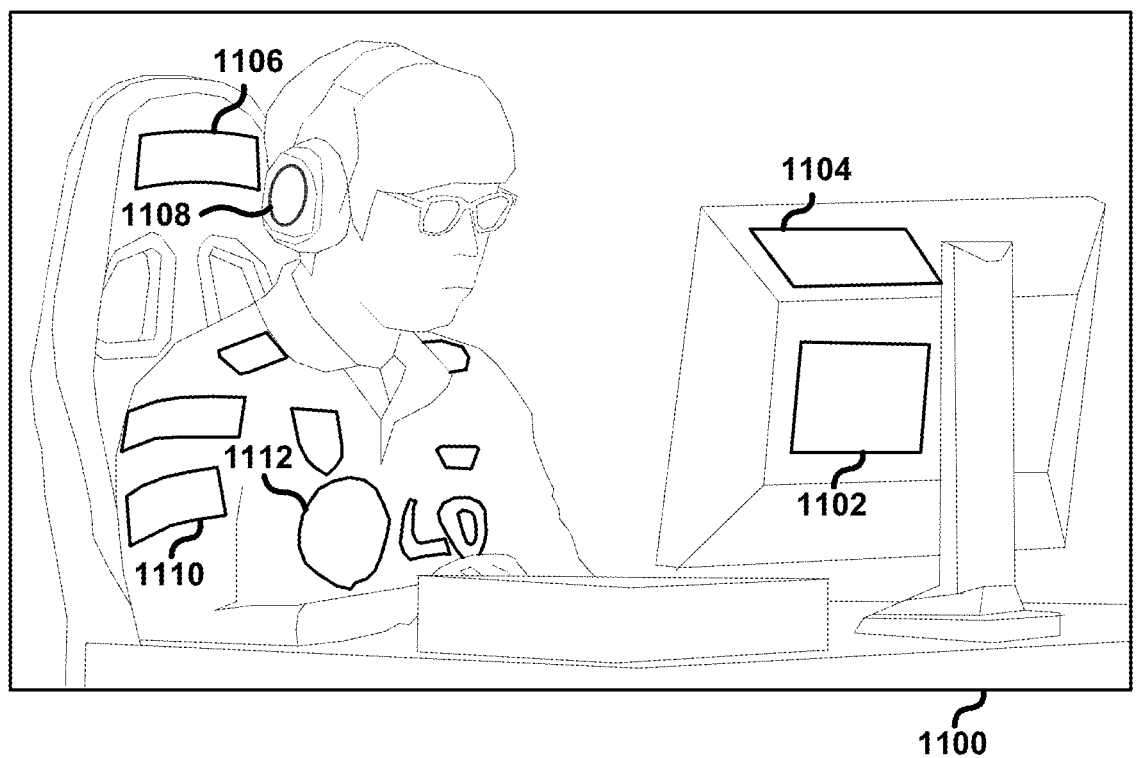
FIG. 11 shows additional embodiments of real world objects that are configurable to be reskinned.

FIG. 11 shows additional real world objects that may be configurable to be reskinned. In many esports events, there may be a multitude of video cameras that capture the players from different angles. In the embodiment shown, a shot 1000 of a player interacting with a video game includes a number of real world objects that may be reskinned. For example, regions 1102 and 1104 associate with the monitor the player is using may be configurable to be reskinned. Certain other gaming gear logos such as region 1106 associated with a "performance chair" and region 1108 associated with head phones may also be regions that are compatible with the reskinning logic described here. Moreover, graphics, logos, badges, patches, etc. worn on a player's attire may also be candidate real world objects configurable to be reskinned. For example, regions 1110 and 1112 associated with the player's team jersey or attire are also contemplated to be reskinned for a VR presentation.

Figure 12:
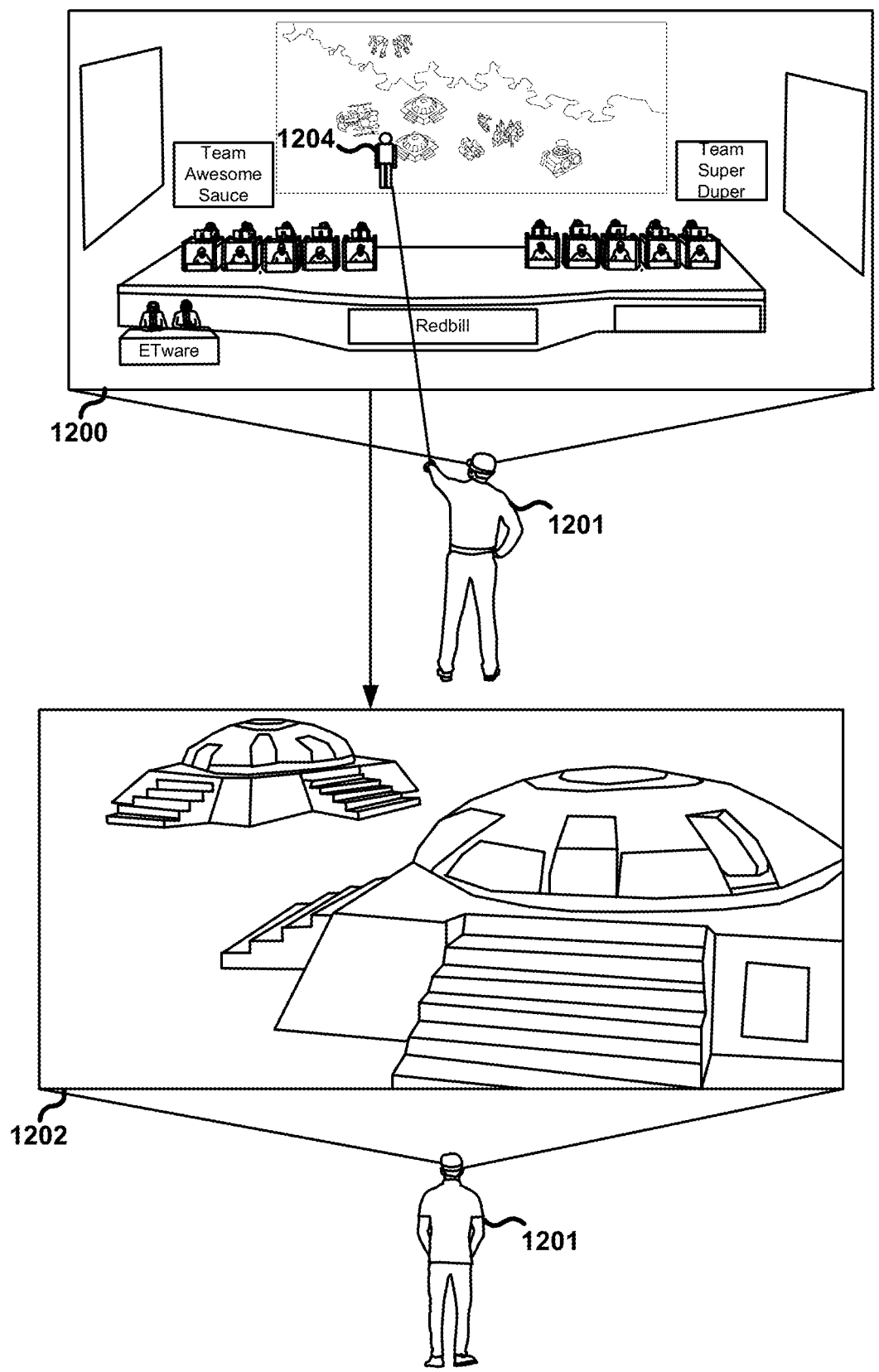
FIG. 12 shows a conceptual illustration of a remote spectator being presented with an in-game fly-through view of the video game being played at an esports event, according to one embodiment.

FIG. 12 shows a conceptual illustration of a remote spectator 1201 being presented with an in-game fly-through view of the video game being played at an esports event, according to one embodiment. The remote spectator receives a first view 1200 of the esports event that is provided by a real world capture system located at the esports event. The remote spectator 1201 may wish to have an "fly-through" view (e.g., first person view) of the game being played to view the game action from a point of view that is "inside" the game. Methods and systems contemplated here allow a user to "jump in" to an esports video game being played at an esports event to receive a fly-through view of the game action. In the embodiment shown, the user points and drags a figurine to a position within the main display of the esports event. In response, the VR presentation changes from a video stream provided by the real world capture system to a second view 1202 that is a fly-through view at a location corresponding to the position that the figurine was placed. The fly-through view is rendered using live game state data of the esports game and may be performed on the HMD, at a computing device associated with the HMD, or at a remote server.

Figure 13:
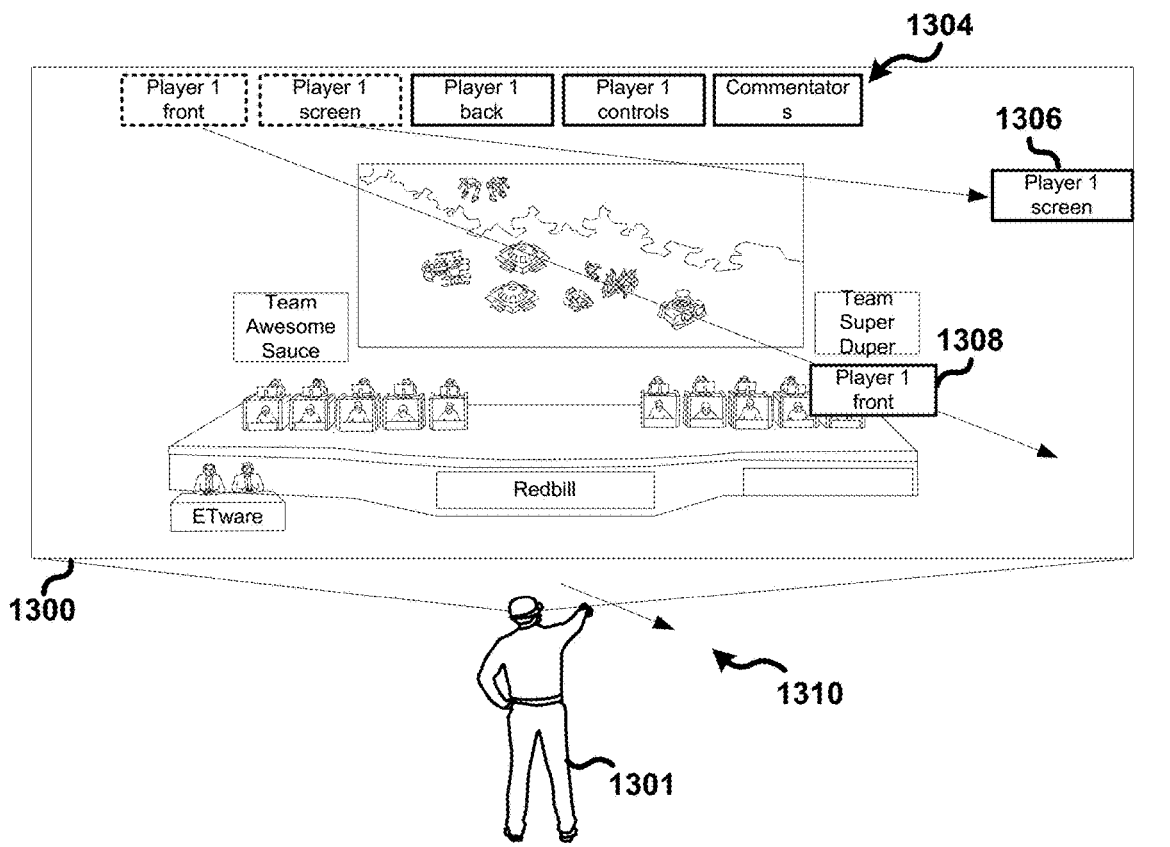
FIG. 13 shows a conceptual illustration of a remote spectator choosing between different views of an esports event for display, according to one embodiment.
Figure 13:
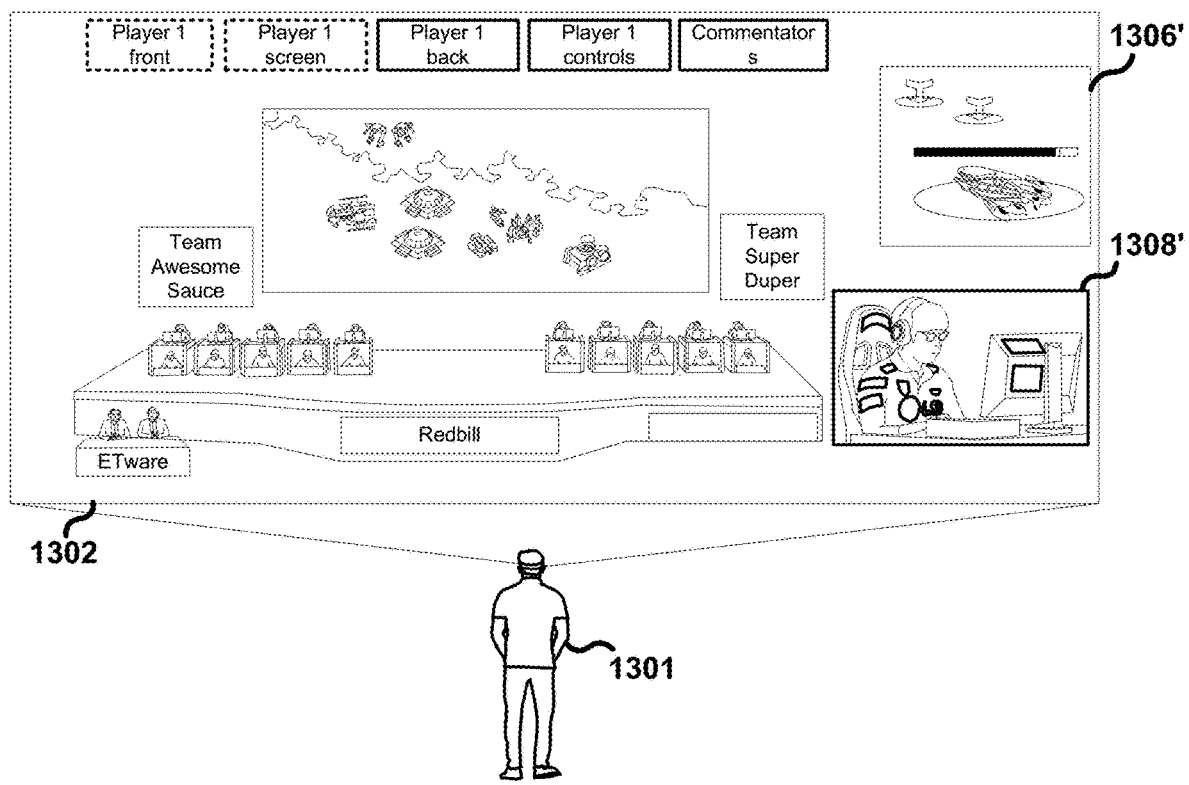

FIG. 13 shows a conceptual illustration of a remote spectator 1301 choosing between different views of an esports event for display, according to one embodiment. In the first view 1300, the remote spectator 1301 is provided with a video feed of the esports event from a real world capture system, as well as a plurality of viewing modules 1304 for selection. The viewing modules may include various camera views of the real world such as portrait views of the players, views from behind the players, views of the players interacting with a keyboard, mouse, touchpad, joystick, or other input device, views of individual player screens, fly-through views, views of the audience, views of the commentators, etc. The remote spectator 1301 is shown to have selected a player 1 screen view 1306 and is in the process of selecting player 1 front view 1308 by pointing and dragging 1310 the view module associated with the player 1 front view 1308 to a location within the VR presentation that is desired for display.

In the second view 1302 of the VR presentation, the selected viewing modules are shown to be displayed at the selected locations. For example, player 1 screen view 1306' is shown to display a mirroring of what player 1 sees on their own screen. Thus, the remote spectator 1301 is able to see the control actions such as clicks and commands performed by player 1. Additionally, the player 1 front view 1308' is shown to display a view of player 1 that may include facial expression, and controller input actions. As a result, a picture-in-picture or pictures-in-picture view of the esports event may be provided by the methods and system contemplated here, where a remote spectator 1301 is enabled to view desired views that they may not otherwise have access to as an in-person spectator. The ability to simultaneously view various camera views and game action views represent additional technological advantages to current esports broadcasts, which do not give remote spectators the same degree of control of what they want to view.

Figure 14:
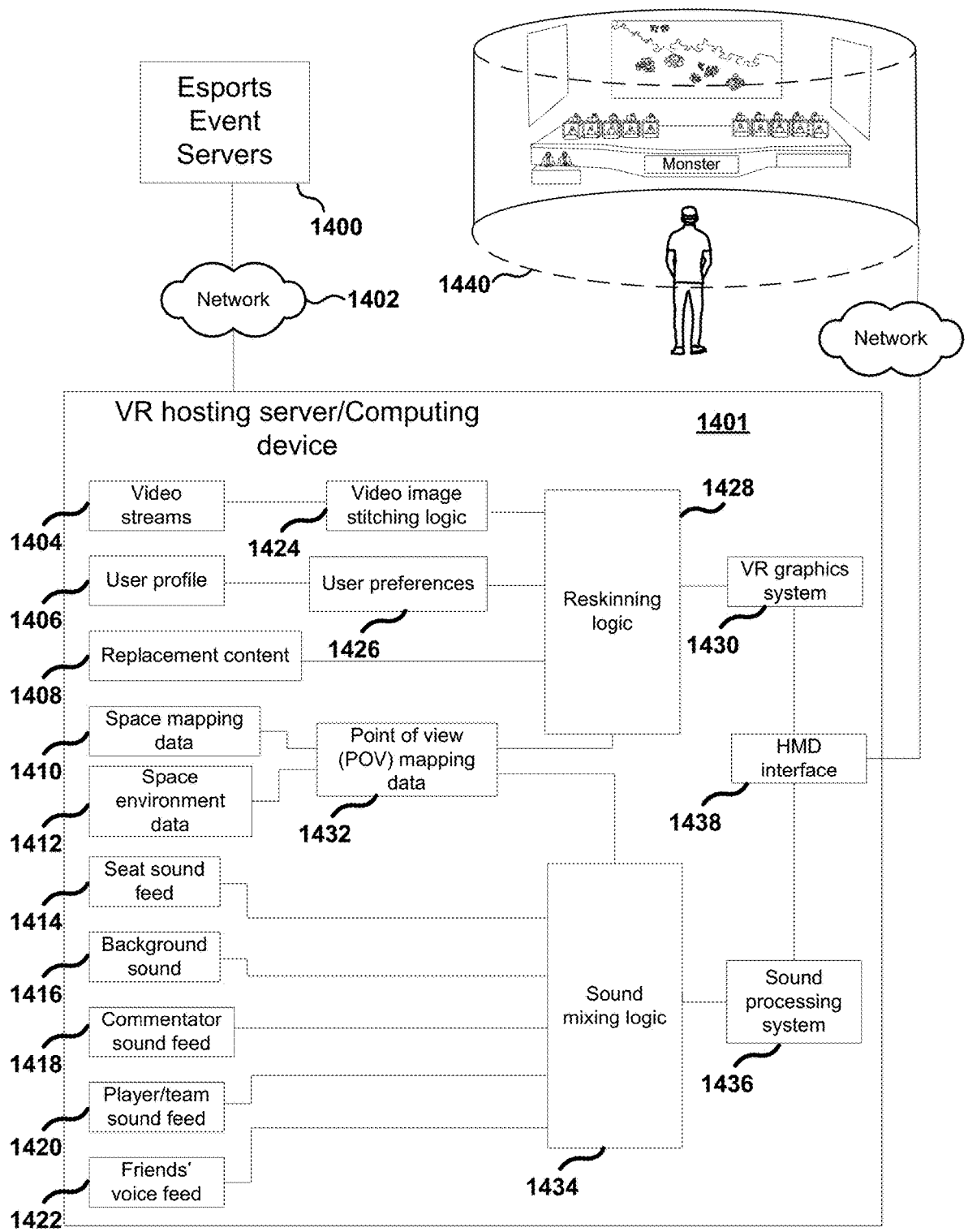
FIG. 14 shows a diagram of an exemplary computing system that enables VR presentation of an esports event via HMD to a user, according to one embodiment.

FIG. 14 shows a diagram of an exemplary VR hosting server/computing device 1401 that enables VR presentation of an esports event via HMD to a user, according to one embodiment. The VR hosting server/computing device 1401 is shown to receive real world data from an Esports event server 1400. Depending on various embodiments, the esports event server 1400 may be from a production company or a distribution company that serves data captured at the esports event. The VR hosting server/computing device 1401 is shown to obtain video streams 1404 that include various camera views and game action views of the esports event, as well as space mapping data 1410 of the physical space or arena hosting the esports event, and space environment data 1412 captured by the real world capture system. Additionally, VR hosting server/computing device 1401 is shown to receive a user profile 1406 that includes user preferences and user data, as well as replacement content 1408, which includes, for example, replacement ads.

As mentioned earlier, the video streams 1404 may include a number of video from a number of points of view. And even for a single point of view, there may be multiple video streams that are used to create a 360 degree (or less) field of view. In some embodiments, the multiple video streams that are taken from one location for creating a 360 degree view may be stitched together by a remote server such as the Esports event server 1400 or at a production company or content distributer server. In other embodiments, the video image stitching logic 1424 of the VR hosting server/computing device 1401 may perform a stitching of the multiple video streams having overlapping fields of view to render a 360 degree view. The 360 degree view provided by video image stitching logic 1424 is then fed to reskinning logic 1428. It should be appreciated that although a 360 degree view may be recited by methods and systems presented here, lesser than 360 degree views may be used as well, for example, 180 degree views, or 150 degree views, and so on.

Also fed into reskinning logic 1428 are user preferences 1426 that are analyzed from the user profile 1406. The user preferences 1426 help determine which of replacement content (e.g., replacement ads) may be of interest to the remote spectator. It is to be appreciated that the replacement content 1408 may also include video images for reskinning video clips into VR presentation 1440. Additionally, point of view mapping data 1432 is also fed into the reskinning logic 1428 for performing transforms such as geometric and perspectival modifications to images or video provided by replacement content 1408.

Based on the video stream provided by the video image stitching logic 1424, the user preferences 1426, the replacement content 1408, and the POV mapping data 1432, the reskinning logic 1428 is enabled to reskin real world objects within the video stream with the replacement content in a way that maintains geometric and perspectival consistency with the real world object used for reskinning. The reskinned video stream is then fed to a VR graphics system 1430 that is configured to render a VR presentation to the remote spectator via HMD interface 1438. Although not shown, it is to be understood that various video compressions processes and encoding may be performed at before, within, or after various components shown in VR hosting server/computing device 1401. For example, a video feed outputted by VR graphics system 1430 may undergo compression before being transmitted to HMD interface 1438 for delivery over a network to the HMD.

The HMD/Computing device 1401 is also shown to receive various sound streams, including seat sound feed 1414 that includes sounds captured at the real world capture system, background sound 1416 that includes sounds and noises made by the crowd, commentator sound feed 1418, player/team sound feed 1420, and friends' voice feed 1422. It is contemplated that method and systems described here enable the remote spectator to select between the various sound sources to be delivered in the VR presentation 1440. The sound mixing logic 1434, depending on user selection, is configured to mix the various sounds sources to provide a desired sound output that is fed to a sound processing system 1426. The sound processing system 1426 outputs an audio signal to the VR presentation 1438 via the HMD interface 1438. Again, although not shown, various compression and decompression steps have been left out of the illustration for purposes of clarity. It will be understood, however, that various operations involving compression and decompression, encoding and decoding may be performed before, at, or after any of the modules or steps related to sound. For example, the sound output provided by sound processing system may be encoded before it is transmitted to the HMD via the HMD interface 1438.

Figure 15:
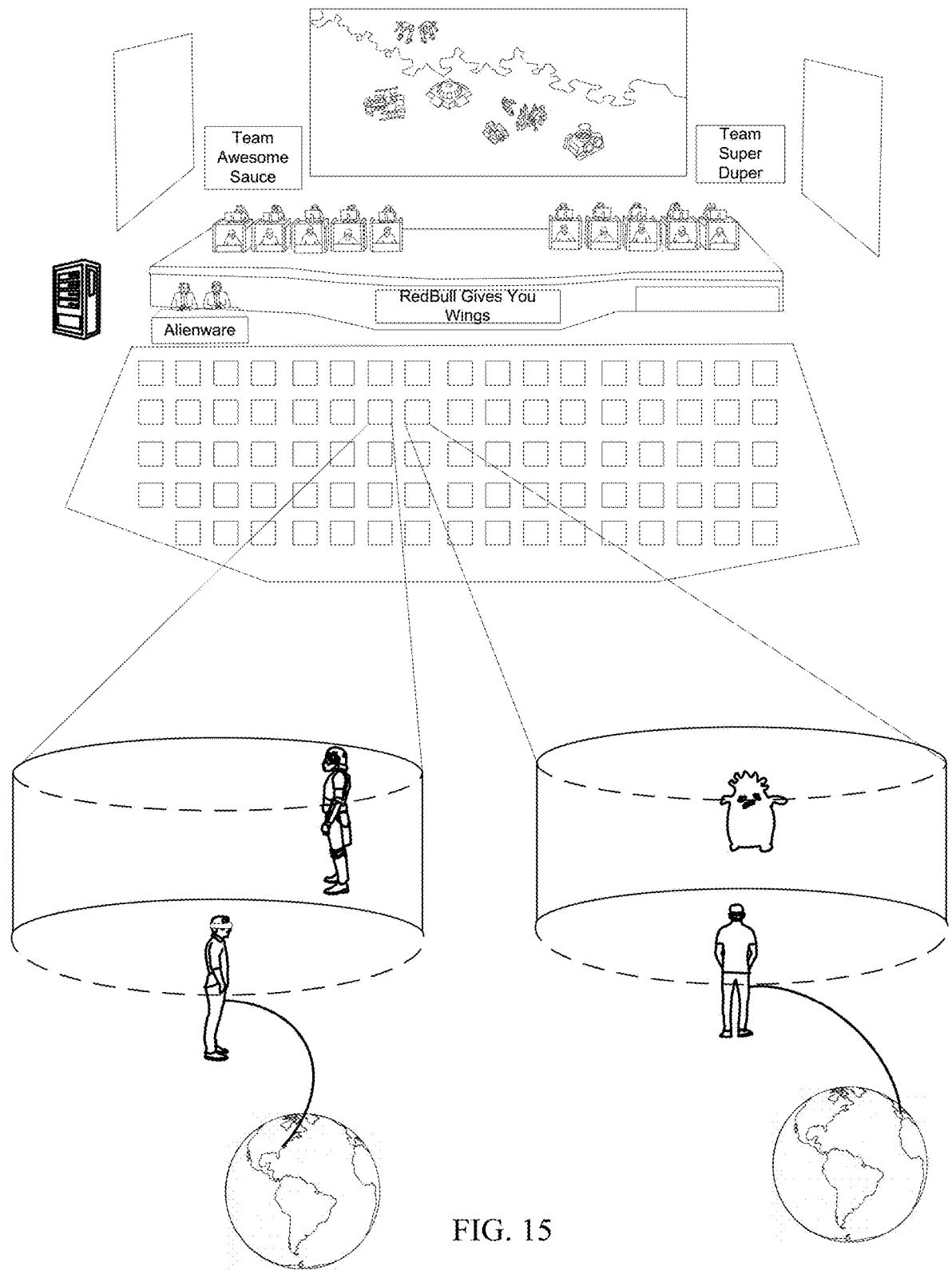
FIG. 15 shows a conceptual illustration of two remote spectators interacting with one another virtually within the context of an esports event, according to one embodiment.

FIG. 15 shows a conceptual illustration of two remote spectators interacting with one another virtually within the context of an esports event, according to one embodiment. The two remote spectators are shown to have selected adjacent seats in the real world space. As a result, they may experience the esports event as if they were there together in person via their respective VR presentations. In some embodiments, the VR presentation may render the VR scene to display a virtual presence of the other remote spectator and vice versa. Thus, each remote spectator sees the other one. In some embodiments, such as the one shown, an avatar may be used for the virtual presence. In other embodiments, a live image or 3D representation of the one of the remote spectators may be rendered in the VR presentation for the other remote spectator. It is also envisioned that more than two spectators may participate in the group spectating experience described above.

In some embodiments, a remote spectator may be able to communicate with a live spectator who is also viewing the esports event. For example, if real world seats are equipped with a real world capture system including cameras, microphones and speakers, a remote spectator may be able to see the live spectator who is sitting next to them in the real world within the VR presentation.

Figure 16:
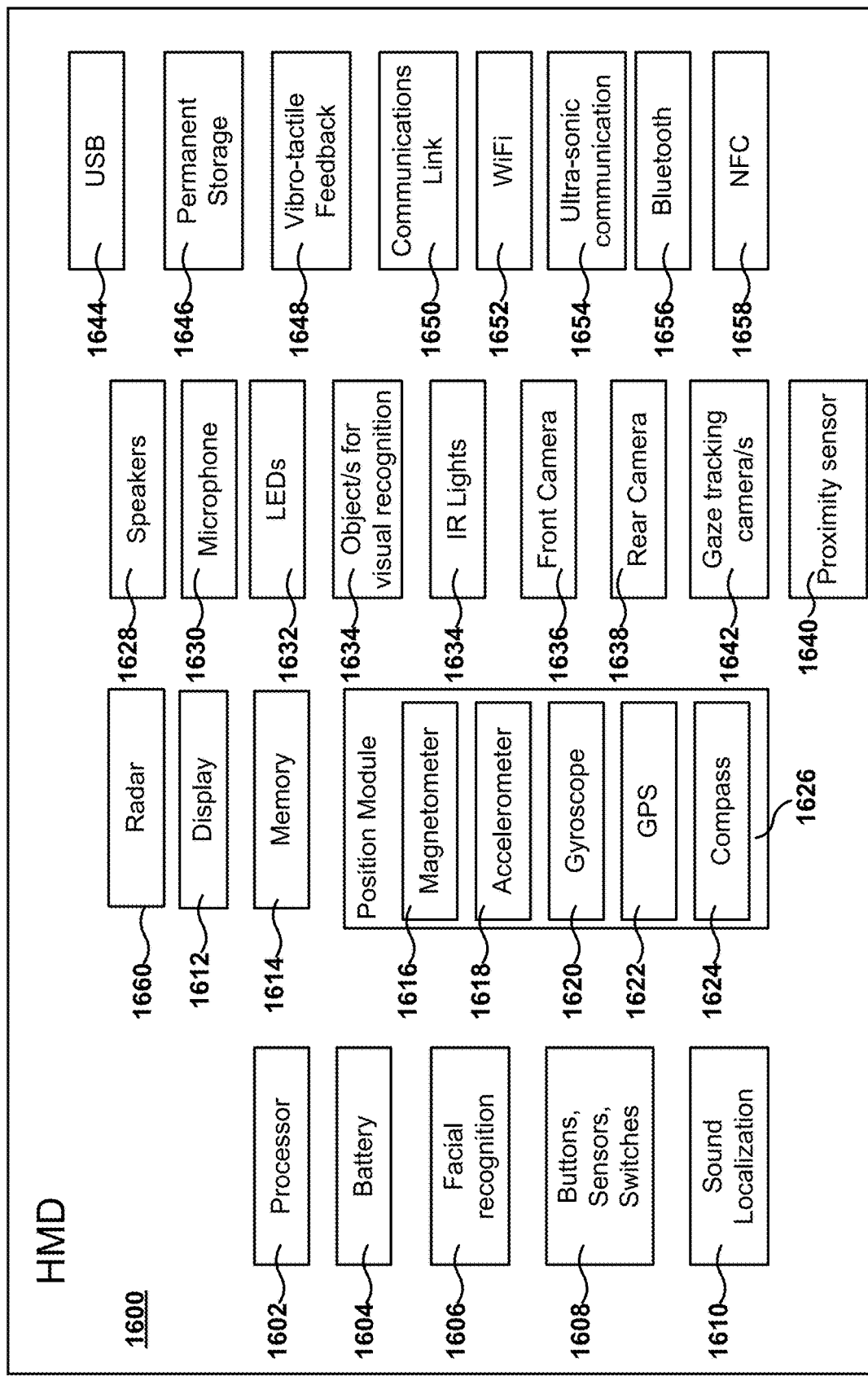
FIG. 16 shows an embodiment of a head mounted display (HMD) capable of being used with methods and processes presented here.

FIG. 16 illustrates an additional embodiment of a HMD 1600 that may be used with the presented method and/or system. HMD 1600 includes hardware such as processor 1602, battery 1604, facial recognition 1606, buttons, sensors, switches 1608, sound localization 1610, display 1612, and memory 1614. HMD 1600 is also shown to include a position module 1626 that comprises a magnetometer 1616, an accelerometer 1618, a gyroscope 1620, a GPS 1622, and a compass 1624. Further included in robot 1600 are speakers 1628, microphone 1630, LEDs 1632, object/s for visual recognition 1634, IR lights 1636, front camera 1638, rear camera 1640, gaze tracking camera/s 1642, USB 1644, permanent storage 1646, vibro-tactile feedback 1648, communications link 1650, WiFi 1652, ultra-sonic communication 1654, Bluetooth 1656, near field communication (NFC) 1658, and radar 1660.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for delivering a virtual reality (VR) presentation of a real world space to a remote user via a head mounted display (HMD), comprising:
identifying a viewing location within the real world space for the user, the viewing location being mapped to a real world capture system in the real world space;
receiving a video stream of the real world space from the real world capture system, the video stream including a plurality of images captured by one or more cameras of the real world capture system, the plurality of images being presented in the HMD from a perspective associated with the viewing location;
reskinning a real world object in the real world space by overlaying a graphical content element in place of image data associated with the real world object; and
sending for presentation the video stream with the reskinning for viewing to the HMD;
wherein the overlaying includes measuring real world distances between the real world capture system and vertices of the real world object.

2. The method of claim 1, further comprising,
geometrically adjusting the graphical content element, the adjusting is based on a perspective of the real world object when viewed from the viewing location.

3. The method of claim 1, further comprising:
tracking, from a plurality of sensors, a position and orientation of the HMD while the user is wearing the HMD;
wherein a field of view of the video stream is made to change in response to movement of the HMD.

4. The method of claim 1, further comprising,
measuring angles formed between rays that are traced from the real world capture system to the vertices.

5. The method of claim 4, wherein the real world distances measured and angles measured are used for the overlaying the graphical content element being geometrically adjusted based on the perspective of the real world capture system.

6. The method of claim 1, wherein the real world object moves and wherein the measuring the real world distances occur in real-time or near real-time as the real world object moves.

7. The method of claim 1, further comprising:
receiving an audio feed of the real world space from the real world capture system, the audio feed being processed according to real world coordinates of the real world capture system associated with the viewing location.

8. The method of claim 1, wherein the real world space includes electronic sports (esports) activity.

9. The method of claim 8, further comprising,
providing in the video stream views of additional video streams in the real world space, the additional video streams include on or more of a front perspective of a player, a rear perspective of a player, a screen of player, a perspective of a control pad of a player, a perspective of a jumbotron of a game, a perspective of one or more commentators, a perspective of a team of players, or a perspective of an audience member.

10. The method of claim 1, further comprising:
receiving a command from the user for a fly-through view of a video game being played in the real world space, the command including a region within the video game for the fly-through view.

11. A method for delivering a virtual reality (VR) presentation of a real world space to a remote user via a head mounted display (HMD), comprising:
identifying a viewing location within the real world space for the user, the viewing location being mapped to a real world capture system in the real world space;
receiving a video stream of the real world space from the real world capture system, the video stream including a plurality of images captured by one or more cameras of the real world capture system, the plurality of images being presented in the HMD from a perspective associated with the viewing location;
reskinning a real world object in the real world space by overlaying a graphical content element in place of image data associated with the real world object; and
sending for presentation the video stream with the reskinning for viewing to the HMD;
wherein the reskinning includes identifying vertices of the real world object within the plurality of images and transforming the graphical content element such that vertices of the graphical content element fit to the vertices of the real world object, the graphical content element having been transformed being used for the overlaying the graphical content element in place of the image data associated with the real world object.

12. Computer readable media having program instructions for delivering a virtual reality (VR) presentation of a real world space to a remote user via a head mounted display (HMD), comprising:
program instructions for identifying a viewing location within the real world space for the user, the viewing location being mapped to a real world capture system in the real world space;
program instructions for receiving a video stream of the real world space from the real world capture system, the video stream including a plurality of images captured by one or more cameras of the real world capture system, the plurality of images being presented in the HMD from a perspective associated with the viewing location;
program instructions for reskinning a portion of a real world object in the real world space by overlaying a graphical content element in place of image data associated with the real world object; and
program instructions for streaming for presentation the video stream with the reskinning for viewing to the HMD;
program instructions for tracking, from a plurality of sensors, a position and orientation of the HMD while the user is wearing the HMD;
wherein a field of view of the video stream is made to change in response to movement of the HMD.

13. The computer readable media of claim 12, further comprising,
program instructions for geometrically adjusting the graphical content element, the adjusting is based on a perspective of the real world object when viewed from the viewing location.

14. The computer readable media of claim 12, wherein the overlaying includes measuring real world distances between the real world capture system and vertices of the real world object.

15. The computer readable media of claim 12, wherein the reskinning includes identifying vertices of the real world object within the plurality of images and transforming the graphical content element such that vertices of the graphical content element fit to the vertices of the real world object, the graphical content element having been transformed being used for the overlaying the graphical content element in place of the image data associated with the real world object.

16. The computer readable media of claim 12, further comprising:
- program instructions for receiving an audio feed of the real world space from the real world capture system, the audio feed being processed according to real world coordinates of the real world capture system associated with the viewing location.

17. The computer readable media of claim 12, wherein the real world space includes electronic sports (esports) activity.

\* \* \* \* \*